(12) United States Patent
Sumiya et al.

(10) Patent No.: US 7,141,966 B2
(45) Date of Patent: Nov. 28, 2006

(54) ROTATION DETECTING APPARATUS

(75) Inventors: Kazuyoshi Sumiya, Hekinan (JP); Seiichiro Ishio, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/167,265

(22) Filed: Jun. 28, 2005

(65) Prior Publication Data
US 2006/0001421 A1 Jan. 5, 2006

(30) Foreign Application Priority Data
Jul. 1, 2004 (JP) .............................. 2004-196038
Nov. 11, 2004 (JP) .............................. 2004-327742

(51) Int. Cl.
G01B 7/30 (2006.01)
G01P 15/08 (2006.01)
G01P 15/105 (2006.01)
G01R 33/038 (2006.01)
G01R 33/09 (2006.01)

(52) U.S. Cl. .............. 324/207.25; 324/252; 73/514.16; 73/514.39

(58) Field of Classification Search ........... 324/207.25, 324/252; 73/514.16, 514.39
See application file for complete search history.

(56) References Cited

U.S. PATENT DOCUMENTS
5,637,995 A * 6/1997 Izawa et al. ................. 324/174
6,356,073 B1 * 3/2002 Hamaoka et al. ........ 324/207.2
2005/0015968 A1 * 1/2005 Shinjo et al. .................. 29/593

FOREIGN PATENT DOCUMENTS
JP        A-7-333236         12/1995

* cited by examiner

*Primary Examiner*—Bot LeDynh
(74) *Attorney, Agent, or Firm*—Posz Law Group, PLC

(57) ABSTRACT

Rotation detecting apparatus for detecting rotation of a magnetic rotor includes: a sensor chip having a magnetoresistive device; and a bias magnet. The magnetoresistive device is capable of detecting change of a magnetic vector near the sensor chip so that the rotation detecting apparatus detects the rotation of the magnetic rotor. The change of the magnetic vector is generated by the bias magnetic field and the rotation of the magnetic rotor. The bias magnet is disposed around the sensor chip so that a deflection angle of the magnetic vector is controllable.

17 Claims, 16 Drawing Sheets

FIG. 7A

| M-M DISTANCE (WITH NO GROOVE) | 0.8 | 0.9 | 1 | 1.1 | 1.2 | 1.3 | 1.4 | 1.5 | 1.6 | 1.7 | 1.8 | UNIT |
|---|---|---|---|---|---|---|---|---|---|---|---|---|
| OPEN DEGREE AT VM | 91.6 | 59.5 | 42.3 | 32.0 | 25.2 | 20.2 | 16.5 | 13.6 | 11.2 | 9.2 | 7.5 | deg |
| OPEN DEGREE AT VC | -2.2 | -2.6 | -3.0 | -3.4 | -3.7 | -4.1 | -4.4 | -4.8 | -5.1 | -5.4 | -5.8 | deg |
| DEFLECTION ANGLE | 93.8 | 62.1 | 45.3 | 35.4 | 28.9 | 24.3 | 21.0 | 18.4 | 16.3 | 14.7 | 13.3 | deg |
| MAGNETIC STRENGTH AT VM | -3.6 | -6.1 | -8.4 | -10.4 | -12.3 | -14.0 | -15.5 | -16.8 | -18.0 | -19.0 | -20.0 | mT |
| MAGNETIC STRENGTH AT VC | -23.2 | -25.3 | -27.1 | -28.7 | -30.1 | -31.4 | -32.4 | -33.3 | -34.1 | -34.7 | -35.2 | mT |

FIG. 7B

| M-M DISTANCE (WITH GROOVE) | 0.8 | 0.9 | 1 | 1.1 | 1.2 | 1.3 | 1.4 | 1.5 | 1.6 | 1.7 | 1.8 | UNIT |
|---|---|---|---|---|---|---|---|---|---|---|---|---|
| OPEN DEGREE AT VM | 131.9 | 96.9 | 73.0 | 56.7 | 45.3 | 36.9 | 30.5 | 25.5 | 21.4 | 18.0 | 15.2 | deg |
| OPEN DEGREE AT VC | 12.6 | 10.2 | 8.2 | 6.5 | 5.0 | 3.6 | 2.4 | 1.4 | 0.4 | -0.4 | -1.2 | deg |
| DEFLECTION ANGLE | 119.3 | 86.7 | 64.8 | 50.2 | 40.3 | 33.3 | 28.0 | 24.1 | 21.0 | 18.5 | 16.5 | deg |
| MAGNETIC STRENGTH AT VM | -2.6 | -5.0 | -7.1 | -9.0 | -10.8 | -12.4 | -13.9 | -15.2 | -16.3 | -17.4 | -18.3 | mT |
| MAGNETIC STRENGTH AT VC | -21.0 | -22.9 | -24.7 | -26.2 | -27.6 | -28.8 | -29.8 | -30.7 | -31.5 | -32.2 | -32.7 | mT |

FIG. 7C

| M-M DISTANCE | 1 | 1.1 | 1.2 | 1.3 | 1.4 | 1.5 | 1.6 | 1.7 | 1.8 | UNIT |
|---|---|---|---|---|---|---|---|---|---|---|
| DEFLECTION ANGLE (WITH NO GROOVE) | 40.0 | 32.3 | 27.0 | 23.0 | 20.0 | 17.6 | 15.7 | 14.2 | 12.9 | deg |
| DEFLECTION ANGLE (WITH GROOVE) | 54.9 | 44.8 | 37.1 | 31.1 | 26.5 | 22.9 | 20.1 | 17.8 | 15.9 | deg |
| MAGNIFICATION | 1.37 | 1.39 | 1.37 | 1.35 | 1.33 | 1.30 | 1.28 | 1.25 | 1.23 | SCALE FACTOR |

FIG. 8
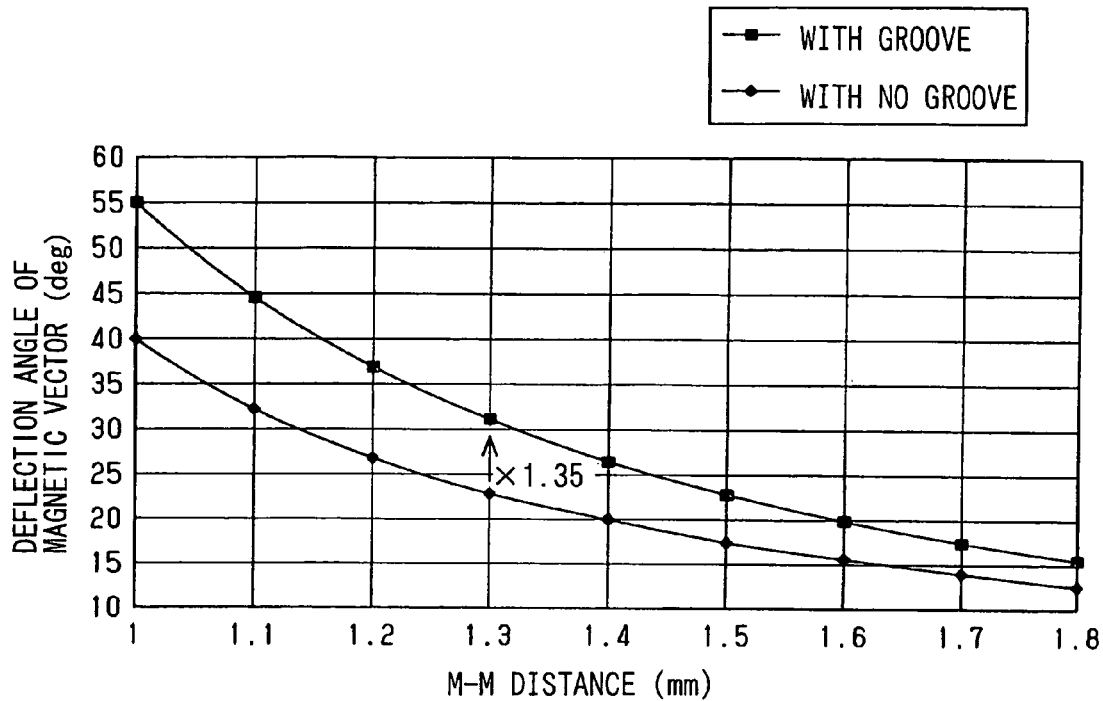
FIG. 9A    FIG. 9B    FIG. 9C
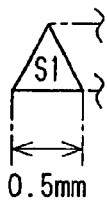 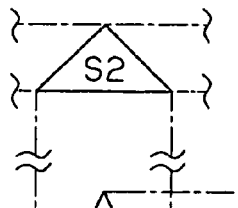 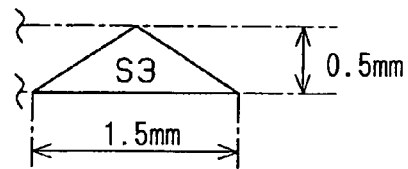
FIG. 9D
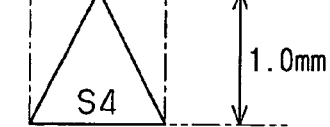
FIG. 9E
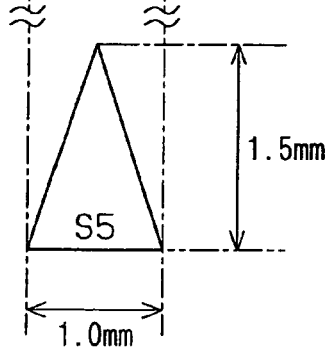

FIG. 12

| SAMPLE NO. | SHAPE OF GROOVE | WIDTH X | DEPTH Z | LENGTH L | DEPLETION ANGLE (deg) | | |
|---|---|---|---|---|---|---|---|
| | | | | | AG=0.5mm | AG=1.0mm | AG=1.5mm |
| U1 | NO GROOVE | 0 | 0 | 0 | 24.3 | 14.2 | 8.6 |
| U2 | TRIANGLE | 2 | 0.8 | 2.5 | 29.8 | 16.3 | 9.6 |
| U3 | TRIANGLE | 2 | 0.8 | 6.7 | 33.8 | 20.4 | 12.7 |
| U4 | TRIANGLE | 2 | 0.8 | 10 | 32.9 | 20.0 | 12.6 |
| U5 | TRIANGLE | 2 | 0.8 | 13.5 | 33.3 | 20.2 | 12.7 |
| U6 | ONE SIDE TRIANGLE | 2 | 0.8 | 13.5 | 28.6 | 17.0 | 10.6 |

FIG. 15

| SAMPLE NO. | SHAPE OF GROOVE | WIDTH X | DEPTH Z | LENGTH L | DEPLETION ANGLE (deg) | | |
|---|---|---|---|---|---|---|---|
| | | | | | AG=0.5mm | AG=1.0mm | AG=1.5mm |
| V1 | HALF CIRCLE | 2.4 | 0.8 | 13.5 | 36.5 | 23.5 | 15.3 |
| V2 | RECTANGLE | 2 | 0.4 | 13.5 | 34.0 | 20.4 | 12.8 |
| V3 | RECTANGLE | 2 | 0.8 | 13.5 | 42.6 | 26.2 | 16.6 |
| V4 | TRIANGLE | 2.4 | 0.8 | 13.5 | 34.2 | 21.0 | 13.3 |

ROTATION DETECTING APPARATUS

CROSS REFERENCE TO RELATED APPLICATIONS

This application is based on Japanese Patent Applications No. 2004-196038 filed on Jul. 1, 2004, and No. 2004-327742 filed on Nov. 11, 2004, the disclosures of which are incorporated herein by reference.

FIELD OF THE INVENTION

The present invention relates to rotation detecting apparatus.

BACKGROUND OF THE INVENTION

A rotation detecting apparatus detects, for instance, revolutions of an engine mounted on a vehicle, and rotations of a rotator provided in a general-purpose machine. More specifically, the rotation detecting apparatus is capable of detecting rotation modes of the rotor by utilizing changes contained in resistance values of magnetic resistance elements.

Conventionally, as the above-described rotation detecting apparatus capable of detecting the rotations by utilizing the resistance value changes in the magnetic resistance elements, for example, a rotation detecting apparatus described in Japanese Laid-open Patent Application No. H07-333236 is known.

This rotation detecting apparatus includes a magnetic resistance element and a biasing magnet. The magnetic resistance element and the biasing magnet are stored into a case member. In this rotation detecting apparatus, a tip portion of the biasing magnet abuts against an inside bottom plane of the case member, and further, a tip portion of a molding member containing a magnetic sensor chip abuts against a projection portion formed on this inside bottom plane, so that such an "M-to-M distance" is determined, and this "M-to-M distance" corresponds to a distance between the magnetic resistance element and the biasing magnet. In other words, in this rotation angle detecting apparatus, deflection angles of the above-explained magnetic vectors which also contain a relationship with a rotor via a projected length of the projection portion formed on the inside bottom plane of the case member are optimized, namely, a sensing sensitivity as to the rotation angle detecting apparatus is optimized.

On the other hand, although the deflection angles of the magnetic vectors corresponding to the sensing sensitivity for the rotation detecting apparatus can be adjusted based upon the above-described M-to-M distance, the projected length of the projection portion formed on the case member must be changed in order to adjust this sensing sensitivity of the rotation detecting apparatus. As a result, in such a case that the above-explained M-to-M distance must be changed in view of unavoidable reasons and this distance change is caused by, for example, the shape of the rotor for the rotation detection mode, the case member itself must also be changed in view of the unavoidable reason. That is, for instance, parts numbers as to these changed case members must be increased, and also, a total number of metal molds must be unavoidably increased which are required to mold these changed case members. In an actual case, such an adjustment itself that the deflection angles of the magnetic vectors are adjusted only by changing the above-described M-to-M distance may cause some limitations. That is, a freedom of designing as to the rotation detecting apparatus is low, and the range for adjusting the deflection angles of the magnetic vectors is restricted in the practical field.

SUMMARY OF THE INVENTION

In view of the above-described problem, it is an object of the present invention to provide a rotation sensor having high sensing sensitivity and high degree of design freedom.

Rotation detecting apparatus for detecting rotation of a magnetic rotor includes: a sensor chip having a magnetoresistive device; and a bias magnet for applying bias magnetic field to the magnetoresistive device. The bias magnet and the sensor chip are integrated. The magnetoresistive device is capable of detecting change of a magnetic vector near the sensor chip on the basis of resistance change of the magnetoresistive device so that the rotation detecting apparatus detects the rotation of the magnetic rotor. The change of the magnetic vector is generated by the bias magnetic field and the rotation of the magnetic rotor. The bias magnet is disposed around the sensor chip so that a deflection angle of the magnetic vector is controllable.

The above apparatus can control the deflection angle of the magnetic vector so that the detection sensitivity of the rotation is improved. Further, the deflection angle of the magnetic vector can be controlled by the shape of the bias magnet so that the degree of design freedom becomes larger.

Preferably, the bias magnet includes a hollow portion having a groove, and the groove has a predetermined shape for providing control of the deflection angle of the magnetic vector. More preferably, the hollow portion of the bias magnet accommodates the sensor chip, and has a rectangular shape with a pair of wide sides. The wide sides of the hollow portion face the sensor chip, and are parallel to a surface of the sensor chip, the surface on which the magnetoresistive device is disposed, and the groove of the hollow portion extends in a longitudinal direction of the bias magnet.

Further, rotation detecting apparatus for detecting rotation of a magnetic rotor includes: a sensor chip having a magnetoresistive device; and a bias magnet for applying bias magnetic field to the magnetoresistive device. The bias magnet and the sensor chip are integrated in such a manner that the bias magnet is disposed around the sensor chip. The magnetoresistive device is capable of detecting change of a magnetic vector near the sensor chip on the basis of resistance change of the magnetoresistive device so that the rotation detecting apparatus detects the rotation of the magnetic rotor. The change of the magnetic vector is generated by the bias magnetic field and the rotation of the magnetic rotor. The bias magnet includes a hollow portion having a groove. The sensor chip is accommodated in the hollow portion of the bias magnet. The groove is disposed on an inner wall of the hollow portion.

The above apparatus can control the deflection angle of the magnetic vector so that the detection sensitivity of the rotation is improved. Further, the deflection angle of the magnetic vector can be controlled by the shape of the bias magnet so that the degree of design freedom becomes larger.

Further, rotation detecting apparatus for detecting rotation of a magnetic rotor includes: a sensor chip having a magnetoresistive device; and a bias magnet for applying bias magnetic field to the magnetoresistive device. The bias magnet and the sensor chip are integrated in such a manner that the bias magnet is disposed around the sensor chip. The magnetoresistive device is capable of detecting change of a magnetic vector near the sensor chip on the basis of resistance change of the magnetoresistive device so that the rotation detecting apparatus detects the rotation of the magnetic rotor. The change of the magnetic vector is generated by the bias magnetic field and the rotation of the magnetic rotor. The bias magnet includes a hollow portion. The sensor chip is accommodated in the hollow portion of the bias magnet. The hollow portion includes an inner wall, which faces the magnetoresistive device. The bias magnet has a low magnetic strength near the inner wall facing the magnetoresistive device, the low magnetic strength being lower than those of other positions of the bias magnet.

The above apparatus can control the deflection angle of the magnetic vector so that the detection sensitivity of the rotation is improved. Further, the deflection angle of the magnetic vector can be controlled by the shape of the bias magnet so that the degree of design freedom becomes larger.

Further, rotation detecting apparatus for detecting rotation of a magnetic rotor includes: a sensor chip having a magnetoresistive device; and a bias magnet for applying bias magnetic field to the magnetoresistive device. The bias magnet and the sensor chip are integrated in such a manner that the bias magnet is disposed around the sensor chip. The magnetoresistive device is capable of detecting change of a magnetic vector near the sensor chip on the basis of resistance change of the magnetoresistive device so that the rotation detecting apparatus detects the rotation of the magnetic rotor. The change of the magnetic vector is generated by the bias magnetic field and the rotation of the magnetic rotor. The bias magnet includes a hollow portion. The sensor chip is accommodated in the hollow portion of the bias magnet. The hollow portion includes an inner wall, which faces the magnetoresistive device. The bias magnet has a high magnetic strength portion near the inner wall not facing the magnetoresistive device, the high magnetic strength portion having high magnetic strength higher than those of other positions of the bias magnet.

The above apparatus can control the deflection angle of the magnetic vector so that the detection sensitivity of the rotation is improved. Further, the deflection angle of the magnetic vector can be controlled by the shape of the bias magnet so that the degree of design freedom becomes larger.

BRIEF DESCRIPTION OF THE DRAWINGS

The above and other objects, features and advantages of the present invention will become more apparent from the following detailed description made with reference to the accompanying drawings. In the drawings:

FIGS. 7A to 7C are tables explaining results of the first simulation, according to the first embodiment;

FIG. 8 is a graph showing a relationship between a M-M distance and a deflection angle of a magnetic vector obtained by the first simulation, according to the first embodiment;

FIGS. 9A to 9E are plan views showing a triangle groove of the biasing magnet of the second simulation, according to the first embodiment;

FIG. 12 is a table explaining results of the third simulation, according to the first embodiment;

FIG. 15 is a table explaining results of a simulation of the biasing magnet shown in FIGS. 13 and 14, according to the first embodiment;

DETAILED DESCRIPTION OF THE PREFERRED EMBODIMENTS (First Embodiment)

Figure 17:
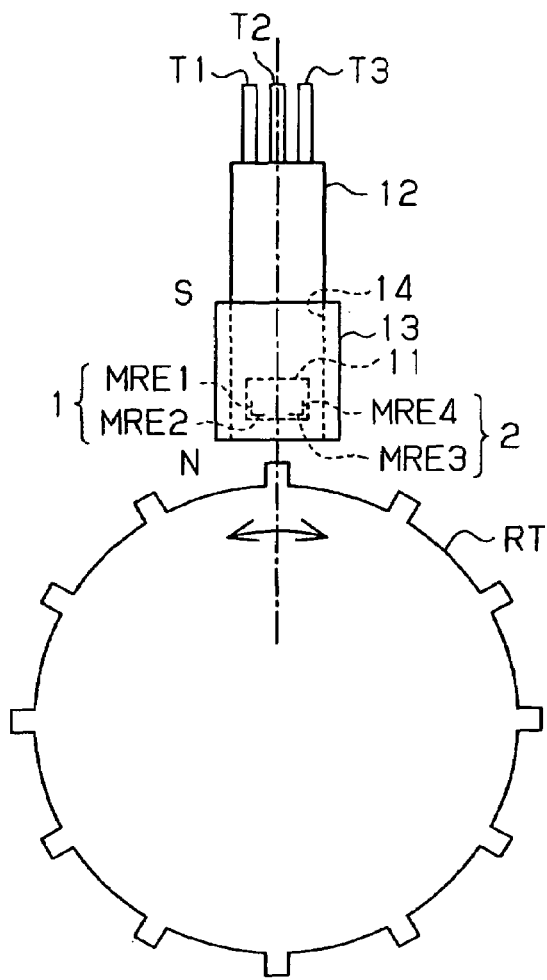
FIG. 17 is a schematic view explaining rotation detection by using rotation detecting apparatus according to a comparison of the first embodiment.

The inventors have preliminary studied about rotation detecting apparatus as a comparison of a first embodiment of the present invention. The apparatus is capable of detecting rotations by utilizing resistance value changes in the magnetic resistance elements. FIG. 17 indicates a flat-surface structure of a rotation detecting apparatus such as a crank angle sensor of an engine.

As shown in FIG. 17, in this rotation detecting apparatus, a sensor chip 11 has been arranged in such a manner that this sensor chip 11 is located opposite to a rotor "RT" which corresponds to an object to be detected. The sensor chip 11 has been equipped with a magnetic resistance element pair 1 which is constituted by two pieces of magnetic resistance elements MRE1 and MRE2; and also, another magnetic resistance element pair 2 which is constituted by two pieces of magnetic resistance elements MRE3 and MRE4. Then, the sensor chip 11 has been manufactured in an integrated circuit form in combination with a processing circuit for this sensor chip 11, and the integrated sensor chip member has been molded in an integral body by using a molding member 12. Concretely, this rotation detecting apparatus owns the following structure. That is, the sensor chip 11 has been mounted on one end of a lead frame (not shown) inside the molding member 12, and various terminals such as a power supply terminal T1, an output terminal T2, and a GND (ground) terminal T3 have been conducted from the other end of the lead frame. Also, a biasing magnet 13 has been arranged in the vicinity of the sensor chip 11 in such a manner that this biasing magnet 13 surrounds the molding member 12. The biasing magnet 13 applies biasing magnetic fields to both the above-described magnetic resistance element pairs 1 and 2. Then, this biasing magnet 13 is made of a hollow cylindrical shape provided with a hollow portion 14 along a longitudinal direction of this biasing magnet 13. While the molding member 12 has been stored in this hollow portion 14, the biasing magnet 13 has been fixed at a predetermined position by using an adhesive agent, or the like.

In the rotation detecting apparatus constructed of the above-explained structure, when the rotor RT is rotated, changes contained in magnetic vectors which are generated in conjunction with the above-described biasing magnetic fields may be sensed as changes contained in resistance values of the respective magnetic, resistance elements MRE1 to MRE4, and then, electric signals may be outputted from the sensor chip 11 in response to the sensed resistance value changes. That is, in this rotation detecting apparatus, changes contained in potentials at a center point between the magnetic resistance elements MRE1 and MRE2 of the magnetic resistance element pair 1 which constitutes a half bridge circuit, and also, in potentials at a center point between the magnetic resistance elements MRE3 and MRE4 of the magnetic resistance element pair 2 which similarly constitutes a half bridge circuit, are applied to the above-described processing circuit. In the processing circuit, various sorts of process operations such as a differential amplifying operation and a binary processing operation are carried out with respect to the potential changes, and thereafter, the process electric signals are derived from the output terminal T2.

Figure 18:
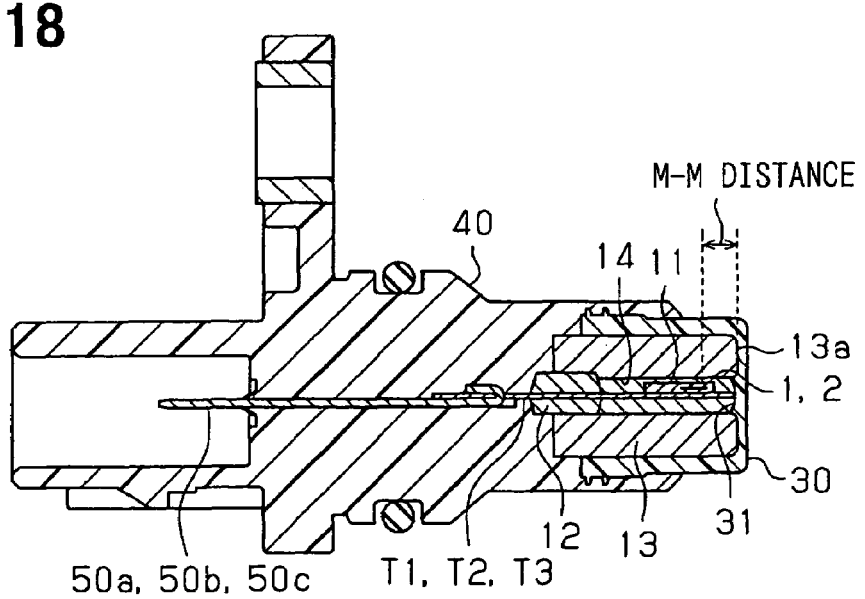
FIG. 18 is a cross sectional view showing the rotation detecting apparatus according to the comparison of the first embodiment.

Also, in the case that such a rotation detecting apparatus for detecting the rotation modes of the rotor is used in a practical field, both the molding member 12 which has molded the sensor chip 11 and the like, and the biasing magnet 13 are stored in a proper case member. In addition, while the entire rotation detecting apparatus has been stored in a resin case which may protect the respective terminals T1 to T3 in combination with this case member, the resultant resin case is mounted on an engine, and the like. FIG. 18 indicates an example as to rotation detecting apparatus having the above-explained structure, which is mounted on an engine, and the like.

As indicated in FIG. 18, in such rotation detecting apparatus, both the molding member 12 and the biasing magnet 13 are stored into a case member 30 having a bottom-having cylindrical shape, and these members 12, 13, 30 are molded with a resin case 40 in an integral body. The molded resin case 40 is mounted on an engine, or the like. This resin case 40 may also function as a connecting connector which connects the own resin case 40 to an electronic control apparatus, and the like by a wiring manner. Also, the above-explained respective terminals T1 to T3 have been electrically connected to terminal conducting members 50a to 50c, which also have terminals functioning as the above-described connector. These terminal conducting members 50a to 50c have been provided within the resin case 40 in an integral manner. Then, in this rotation detecting apparatus, a tip portion of the biasing magnet 13 abuts against an inside bottom plane of the case member 30, and further, a tip portion of the molding member 12 containing the sensor chip 11 abuts against a projection portion 31 formed on this inside bottom plane, so that such an "M (i.e., MRE)-to-M (i.e., Magnet) distance" is determined, and this "M-to-M distance" corresponds to a distance between the magnetic resistance element pairs 1 and 2, and the biasing magnet 13. In other words, in this rotation angle detecting apparatus, deflection angles of the above-explained magnetic vectors which also contain a relationship with the rotor RT via a projected length of the projection portion 31 formed on the inside bottom plane of the case member 30 are optimized, namely, a sensing sensitivity as to the rotation angle detecting apparatus is optimized.

On the other hand, although the deflection angles of the magnetic vectors corresponding to the sensing sensitivity for the rotation detecting apparatus can be adjusted based upon the above-described M-to-M distance, as previously explained, the projected length of the projection portion 31 formed on the case member 30 must be changed in order to adjust this sensing sensitivity of the rotation detecting apparatus. As a result, in such a case that the above-explained M-to-M distance must be changed in view of unavoidable reasons and this distance change is caused by, for example, the shape of the rotor RT for the rotation detection mode, the case member 30 itself must also be changed in view of the unavoidable reason. That is, for instance, parts numbers as to these changed case members 30 must be increased, and also, a total number of metal molds must be unavoidably increased which are required to mold these changed case members 30. In an actual case, such an adjustment itself that the deflection angles of the magnetic vectors are adjusted only by changing the above-described M-to-M distance may cause some limitations. That is, a freedom of designing as to the rotation detecting apparatus is low, and the range for adjusting the deflection angles of the magnetic vectors is restricted in the practical field.

As a result of experiments performed by the inventors of the present invention, the following facts could be confirmed: That is, the deflection angles of the above-described magnetic vectors are changed in conjunction with the rotations of the rotor in correspondence with the sectional shape of the hollow portion of the biasing magnet, into which the sensor chip is stored. Moreover, the deflection angles of the magnetic vectors, namely, the sensing sensitivity as this rotation detecting apparatus can be greatly improved, depending upon the sectional shape of the hollow portion. As a consequence, in accordance with the above-explained structure as the rotation detecting apparatus, while a relative positional relationship (for example, previously-explained "M-to-M" distance) among the magnetic resistance elements and the biasing magnet is not always changed, the deflection angles of the magnetic vectors which are give influences to the magnetic resistance elements can be adjusted by the sectional shape of the hollow portion. Not only the deflection angles of the magnetic vectors may be enlarged in the above-described manner, but also the improvement of the sensing sensitivity as the rotation detecting apparatus may be easily realized. Moreover, the deflection angles of the magnetic vectors may be basically adjusted by arranging the sectional shape of the hollow portion, so that the freedom degree as to designing of this rotation detecting apparatus may be largely improved.

Also, in this case, as the sectional shape of the hollow portion of the biasing magnet, for instance, in accordance with an inventive idea, such a shape may become advantageous that a groove has been formed in an inner side wall of the hollow portion of the above-described biasing magnet. This shape could also be confirmed by the experiments made by the inventors of the present invention.

Then, as this groove, for example, in accordance with an inventive idea, in such a case that the hollow portion of the biasing magnet has been formed in a substantially rectangular shape which corresponds to the sectional shape of the sensor chip, it may be effective to provide a groove in such a forming mode that this groove is elongated along a longitudinal direction of the biasing magnet with respect to an inner side wall of each of long edge sides of the hollow portion, which is located in parallel to and opposite to the arranging plane of the magnetic resistance elements in the sensor chip of the hollow portion. Moreover, in this case, in accordance with an inventive idea, since this groove is formed in the center portions of the inner side walls on the side of the respective long edges of the hollow portion, while the symmetrical characteristic as to the deflection angles of the magnetic vectors may be maintained, the deflection angles of the magnetic vectors can be easily adjusted, namely, can be readily enlarged.

It should be understood that, for example, in accordance with an inventive idea, as to a shape of the above-described groove, the below-mentioned shape can be employed:

(A) A groove is employed, the sectional shape of which is a triangular shape where a groove bottom portion constitutes a vertex.

Alternatively, in accordance with an inventive idea, as to a shape of the above-described groove, the below-mentioned shape can be employed:

(B) A groove is employed, the sectional shape of which is a semi-circular shape where a groove bottom portion constitutes an arc. Since the groove whose sectional shape is a triangular shape or semi-circular shape is employed, when the biasing magnet is molded by employing a metal mold, fluidity owned by a magnetic material within this metal mold can be hardly blocked by the groove. As a consequence, the magnetic material having better uniformity can be molded as the biasing magnet, as compared with that of such a case that a groove having another different shape is employed. Also, since these groove shapes are employed, the above-described adjusting operation as to the deflection angles of the magnetic vectors can be easily and firmly realized, which could also be confirmed by experiments made by the inventors of the present invention.

Referring now to FIG. 1 to FIG. 12, a first embodiment mode for embodying a rotation detecting apparatus according to the present invention will be described.

Figure 1:
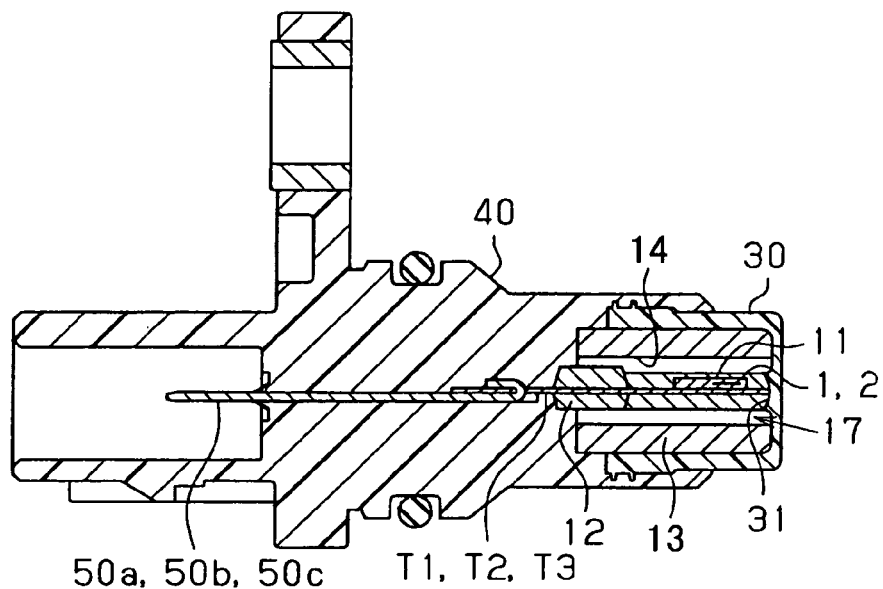
FIG. 1 is a cross sectional view showing rotation detecting apparatus according to a first embodiment of the present invention.

FIG. 1 indicates an entire structure of the rotation detecting apparatus according to this embodiment mode. As indicated in FIG. 1, this rotation detecting apparatus has been arranged in a similar mode as represented in, for example, FIG. 17. That is, a molding member 12 containing a sensor chip 11 in which both the magnetic resistance element pairs 1 and 2 have been arranged in the similar mode, and a biasing magnet 13 which applies biasing magnetic fields to both the magnetic resistance element pairs 1 and 2 have been stored in a bottom-having cylindrical shaped case member 30. This case member 30 has a projection portion 31. Also, this case member 30 has been assembled in a resin case 40 in an integral body. The resin case 40 has been molded in such a manner that this resin case 40 may also function as a connecting connector which connects the own resin case 40 to an electronic control apparatus, and the like by a wiring manner. On the other hand, the above-explained respective terminals T1 to T3 have been electrically connected to terminal conducting members 50a to 50c which also have terminals functioning as the above-described connector. These terminal conducting members 50a to 50c have been provided within the resin case 40 in an integral body. However, in accordance with this embodiment mode, the above-described biasing magnet 13 has been manufactured with the following feature, as separately shown in a front view thereof of FIG. 2. That is, in this biasing magnet 13, a triangular groove 17 has been formed in a center portion of an inner side wall on the side of each of long edges which are located parallel to and opposite to the arranging planes of the magnetic resistance element pairs 1 and 2 in the sensor chip 11. Each of the triangular grooves 17 has been formed in such a triangular shape as viewed in a sectional plane thereof. In this triangular shape, a groove bottom portion constitutes a vertex. As apparent from also FIG. 1, this triangular groove 17 is elongated along the entire longitudinal direction of the above-explained biasing magnet 13.

Figure 2:
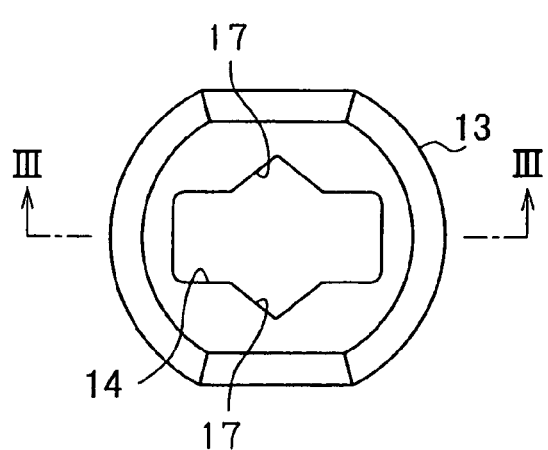
FIG. 2 is a plan view showing a biasing magnet of the apparatus according to the first embodiment.
Figure 3:
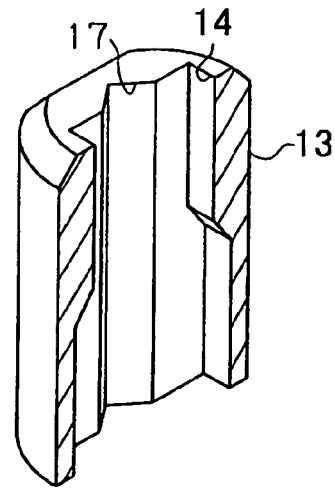
FIG. 3 is a schematic cross sectional view showing the biasing magnet taken along line III—III in FIG. 2.

FIG. 3 is a perspective view for showing a sectional structure of the biasing magnet 13 in the case that such a biasing magnet. 13 is cut along a line III—III represented in FIG. 2. An internal shape of the above-described triangular groove 17 formed in this biasing magnet 13, and an internal shape of a hollow portion 14 are illustratively shown in this drawing.

Next, a description is made of results of simulations which were performed by the inventors of the present invention as to the deflection angles of the above-described magnetic vectors which were changed, since the triangular grooves 17 were formed in the hollow portion 14 of the biasing magnet 13.

The contents of the respective simulations are given as follows: That is, as a first simulation, in the biasing magnet 13 where the above-described triangular grooves 17 had been formed, an analyzing operation was carried out with respect to the deflection angles of the magnetic vectors in such a case that the previously explained "M-to-M distance" was changed. Also, as a second simulation, an analyzing operation was carried out with respect to the deflection angles of the magnetic vectors in the case that the shapes of the triangular grooves 17 were changed. Furthermore, as a third simulation, an analyzing operation was carried out with respect to the deflection angles of the magnetic vectors in the case that the lengths of the triangular grooves 17 were changed. Simulation conditions, simulated results, and the like will be subsequently described in detail according to the first to third simulations.

[First Simulation]

Figure 4A:
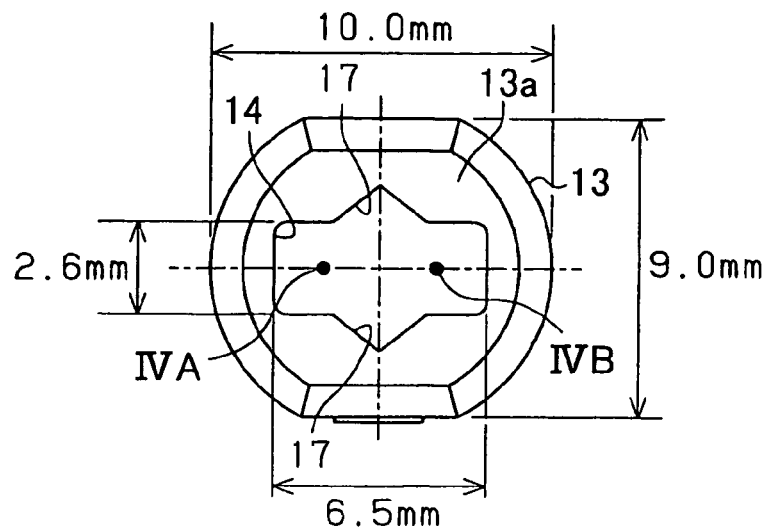
FIGS. 4A and 4C are plan view and side view showing a biasing magnet of the first simulation.
Figure 4B:
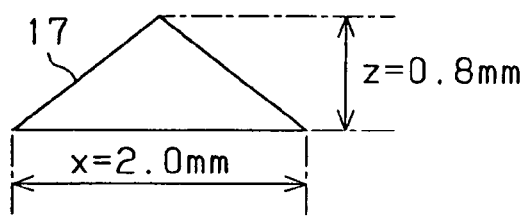
FIG. 4B is a schematic view showing a triangle groove of the biasing magnet of the first simulation, according to the first embodiment.
Figure 4C:
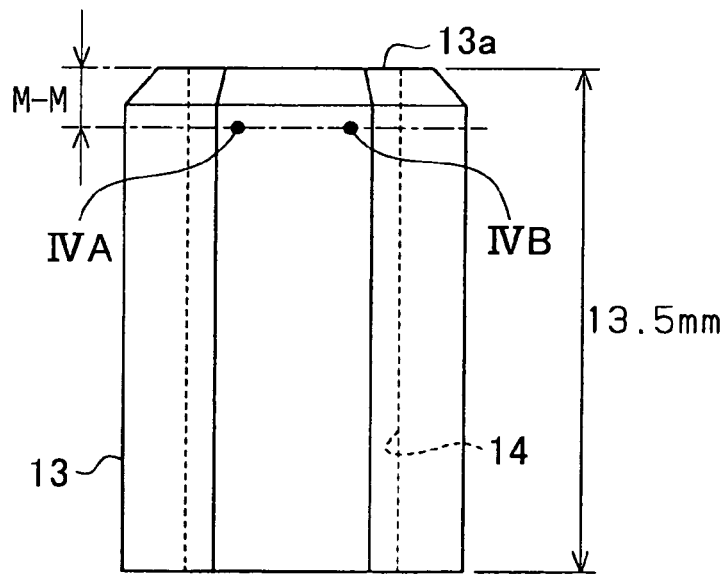

First, a description is made of an analyzing condition with respect to the above-explained first simulation. As shown in FIGS. 4A to 4C, as the biasing magnet 13 which is employed in this analyzing operation, the below-mentioned biasing magnet was used. That is, dimensions of this biasing magnet 13 were given: a length of this biasing magnet 13 was "13.5 mm"; a lateral width thereof was "10.0 mm"; and a longitudinal width thereof was "9.0 mm." In this biasing magnet 13, such a hollow portion 14 was formed, the dimensions of which were given: a lateral width of the hollow portion 14 was "6.5 mm"; and a longitudinal width thereof was "2.6 mm." Also, as the triangular grooves 17 which are formed in this hollow portion 14, such a triangular groove as shown in FIG. 4B was used. That is, dimensions of this triangular groove 17 were given: a width "X" of the triangular groove 17 (namely, width of bottom edge) was "2.0 mm"; and a depth "Z" thereof was "0.8 mm." Then, with employment of the above-described biasing magnet 13, the analyzing operations are carried out in accordance with the following conditions: That is, as analyzing points for analyzing open degrees of the magnetic vectors which are required so as to calculate the above-explained deflection angles of the magnetic vectors, two sets of an analyzing point "IVA" and another analyzing point "IVB" are employed which correspond to positions where the above-described magnetic resistance element pairs 1 and 2 are actually arranged. Also, while distances between these two analyzing points IVA, IVB, and a rotor opposing plane 13a as an edge plane of the biasing magnet 13 are changed, namely M-to-M distances are changed, an analyzing operation is carried out as to how a deflection angle of a magnetic vector is represented with respect to each of the M-to-M distances.

Figure 5:
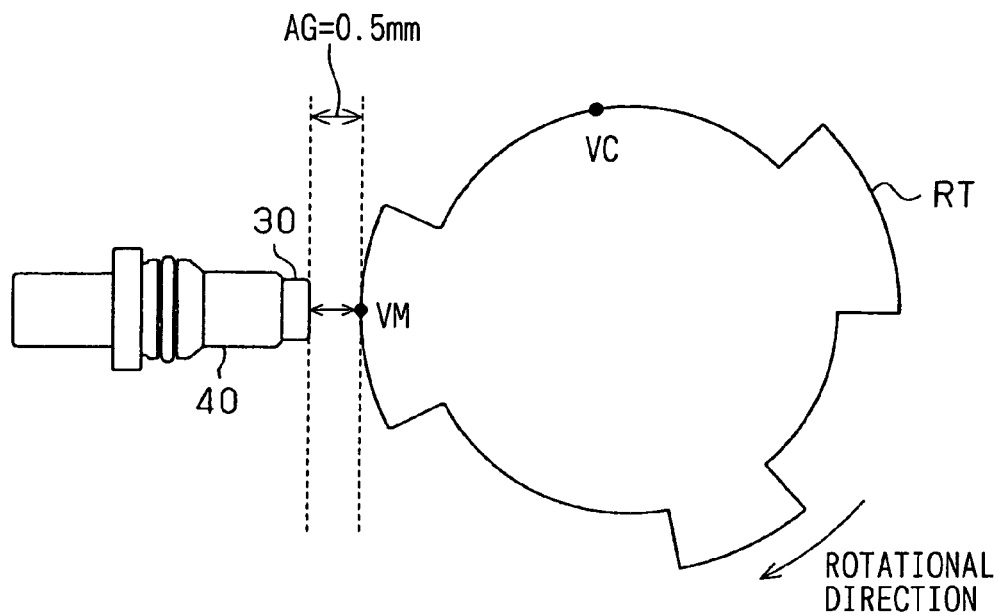
FIG. 5 is a schematic view explaining the first simulation, according to the first embodiment.

On the other hand, as the rotor RT employed in this first analyzing operation, such a rotor "RT" having a shape indicated in FIG. 5 was used. Then, open degrees of magnetic vectors at the above-described analyzing points "IVA" and "IVB" were analyzed when a point "VM" of a hill portion and another point "VC" of a valley portion were located opposite to the above-described rotation detecting apparatus while this rotor RT of FIG. 5 was rotated. Both the point "VM" of the hill portion and the point "VC" of the valley portion have been formed on an outer peripheral portion of the rotor RT. Then, it is so assumed that deflection angles of magnetic vectors are calculated based upon such an angle difference between an open angle of the magnetic vectors at the analyzing points "IVA" and "IVB" when the rotation detecting apparatus is located opposite to the point "VC", and another open angle of the magnetic vectors at the analyzing points "IVA" and "IVB" when the rotation detecting apparatus is located opposite to the point "VM." It should also be understood that as indicated in this FIG. 5, a distance between a rotor opposing plane of the rotation detecting apparatus and a hill portion of the rotor RT is defined as "0.5 mm", namely, an air gap "AG" is set to 0.5 mm.

FIGS. 7A to 7C indicate results of this first simulation. FIG. 7A shows the simulation results obtained from such a biasing magnet 13 that the above-described triangular grooves 17 are not formed. FIG. 7B indicates the simulation results obtained from such a biasing magnet 13 that the above-explained triangular grooves 17 have been formed.

Figure 6A:
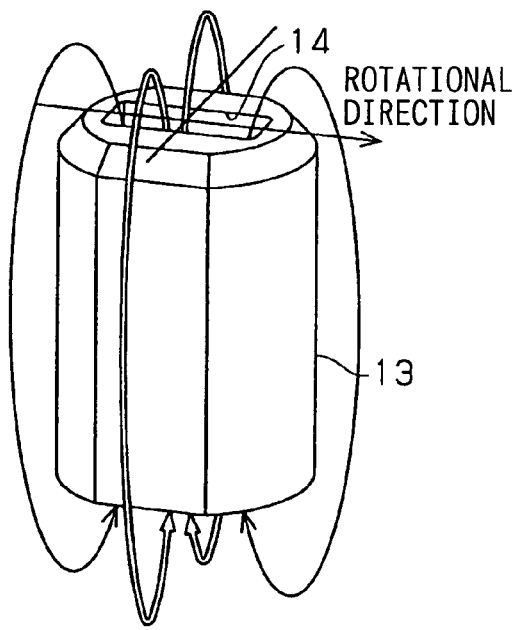
FIG. 6A is a perspective view showing magnetic flux of the biasing magnet with no groove.
Figure 6B:
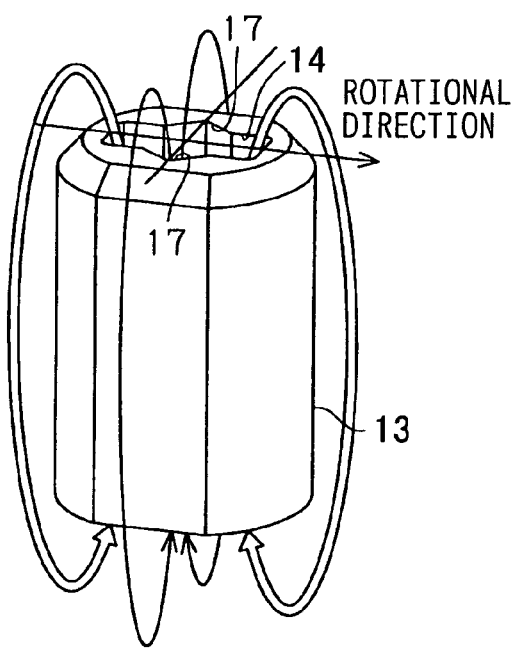
FIG. 6B is a perspective view showing magnetic flux of the biasing magnet with a groove, according to the first embodiment.

As apparent from these simulation results indicated in FIG. 7A and FIG. 7B, as to each of the M-to-M distances, although a magnetic sensitivity of the biasing magnet 13 where the triangular grooves 17 have been formed becomes lower than a magnetic sensitivity of such a biasing magnet 13 where the triangular grooves 17 have not been formed, a deflection angle of a magnetic vector of the first-mentioned biasing magnet 13 with the groove 17 exceeds a deflection angle of a magnetic vector of the last-mentioned biasing magnet 13 with no groove. By the way, as a factor causing the magnetic strength to be lowered, the below-mentioned reason may be conceived. That is, as to the biasing magnet 13 where the triangular grooves 17 have been formed, a volume of this biasing magnet 13 as the magnet is lowered by a volume of the triangular grooves 17, as compared with such a biasing magnet 13 where the triangular grooves 17 are not formed. On the other hand, as a factor causing the deflection angle of the magnetic vector to be enlarged, the below-mentioned reason may be conceived. That is, since the magnetic strength is lowered, the deflectability as to the magnetic vector could be improved. It should also be understood that the following fact may also be conceived as one of these factors. That is, since the triangular grooves 17 are formed in the biasing magnet 13, a generation mode as to magnetic fluxes (magnetic fields) generated from the biasing magnet 13 itself is changed. In other words, as indicated in FIG. 6A, in the previously-explained biasing magnet 13 where no triangular grooves 17 are formed, which has been provided in the rotation detecting apparatus exemplified in FIG. 18, magnetic flux density (arrows of solid lines indicated in FIG. 6A) along the rotation direction of the rotor RT relatively becomes low, as compared with magnetic flux density (white-blanked arrows shown in FIG. 6A) along a direction which is located perpendicular to this rotation direction of the rotor RT. To the contrary, in the biasing magnet 13 where the triangular grooves 17 have been formed, as shown in FIG. 6B, magnetic flux density (white-blanked arrows indicated in FIG. 6B) along the rotation direction of the rotor RT relatively becomes high, as compared with magnetic flux density (arrows of solid lines shown in FIG. 6B) along a direction which is located perpendicular to this rotation direction of the rotor RT. As a result of the high magnetic flux density, it can also be predicted that the deflection angles of the magnetic vectors may be enlarged.

Also, as apparent from a comparison made between values of areas which are surrounded by broken lines in FIG. 7A and FIG. 7B, as to magnetic field strengths at the above-described point "VM", a magnetic field strength of the biasing magnet 13 having no triangular grooves 17, the M-to-M distance of which is "1.3 mm" becomes such a value of "−14.0 mT", whereas a magnetic field strength of the biasing magnet 13 having the triangular grooves 17, the M-to-M distance of which is "1.4 mm" becomes such a value of "−13.9 mT", namely these magnetic field strengths at the point VM are substantially equal to each other. However, also even in this case, the deflection angle of the magnetic vector as to the biasing magnet 13 having no triangular grooves 17 is equal to "24.3 degrees", whereas the deflection angle of the magnetic vector as to the biasing magnet 13 having the triangular grooves 17 is equal to "28.0 degrees", resulting in an improvement of the deflection angle of the magnetic vector, while the adverse influence caused by the "M-to-M" distance can be mitigated.

On the other hand, FIG. 7C shows such a simulation result that the sensitivities of both the magnetic resistance element pairs 1 and 2 have been considered with respect to the magnetic strengths which have been acquired in FIG. 7A and FIG. 7B. This simulation result of FIG. 7C is represented as a graph in FIG. 8. As indicated in FIG. 8, deflection angles of magnetic vectors as to the biasing magnet 13 where the triangular grooves 17 have been formed are enlarged over all of the M-to-M distances, as compared with deflection angles of magnetic vectors as to the biasing magnet 13 where the triangular grooves 17 have not been formed. For example, in the "M-to-M" distance of "1.3 mm" which corresponds to an area surrounded by a broken line of FIG. 7C, a deflection angle of a magnetic vector as to the biasing magnet 13 where the triangular grooves 17 have been formed is enlarged approximately "1.35" times higher than a deflection angle of a magnetic vectors as to the biasing magnet 13 where the triangular grooves 17 have not been formed.

As previously explained, such a confirmation can be made. That is, since the triangular grooves 17 are formed in the hollow portion 14 of the biasing magnet 13, this groove formation may give an extremely large merit in order to enlarge the deflection angles of the magnetic vectors.

[Second Simulation]

Next, a second simulation is explained. In this second simulation, analyzing operations were carried out as to deflection angles of the above-described magnetic vectors in such a case that a width "X", and a depth "Z" as to a triangular groove 17 which will be formed in the hollow portion 14 were changed respectively. It should also be understood that other shapes of this biasing magnet 13 are made equal to those of the previously explained first simulation.

FIGS. 9A to 9E shows shapes of triangular grooves 17 which constitute analysis objects in this second simulation. As represented in FIGS. 9A to 9E, in this second simulation, 5 samples "S1" to "S5" were analyzed respectively. That is, as the samples "S1" to "S3", the below-mentioned triangular grooves 17 have been employed, the widths "X" of which were "0.5 mm"; "1.0 mm"; and "1.5 mm", and also, the depth "Z" of which was "0.5 mm." Furthermore, as the samples "S4" to "S5", the below-mentioned triangular grooves 17 have been employed, the depths "Z" of which were "1.0 mm"; and "1.5 mm", and also, the width "X" of which was "1.0 mm." It should also be understood that in this second simulation, the analyzing operations are carried out in such a case that the above-explained air gaps "AG" are three sorts of air gaps, namely, "0.5 mm"; "1.0 mm"; and "1.5 mm", respectively. It should further be noted that as a shape of a rotor "RT", the same shape as that of the first simulation is used. Further, the analyzing operations are carried out while the above-descried M-to-M distance is fixed to "1.3 mm."

Figure 10:
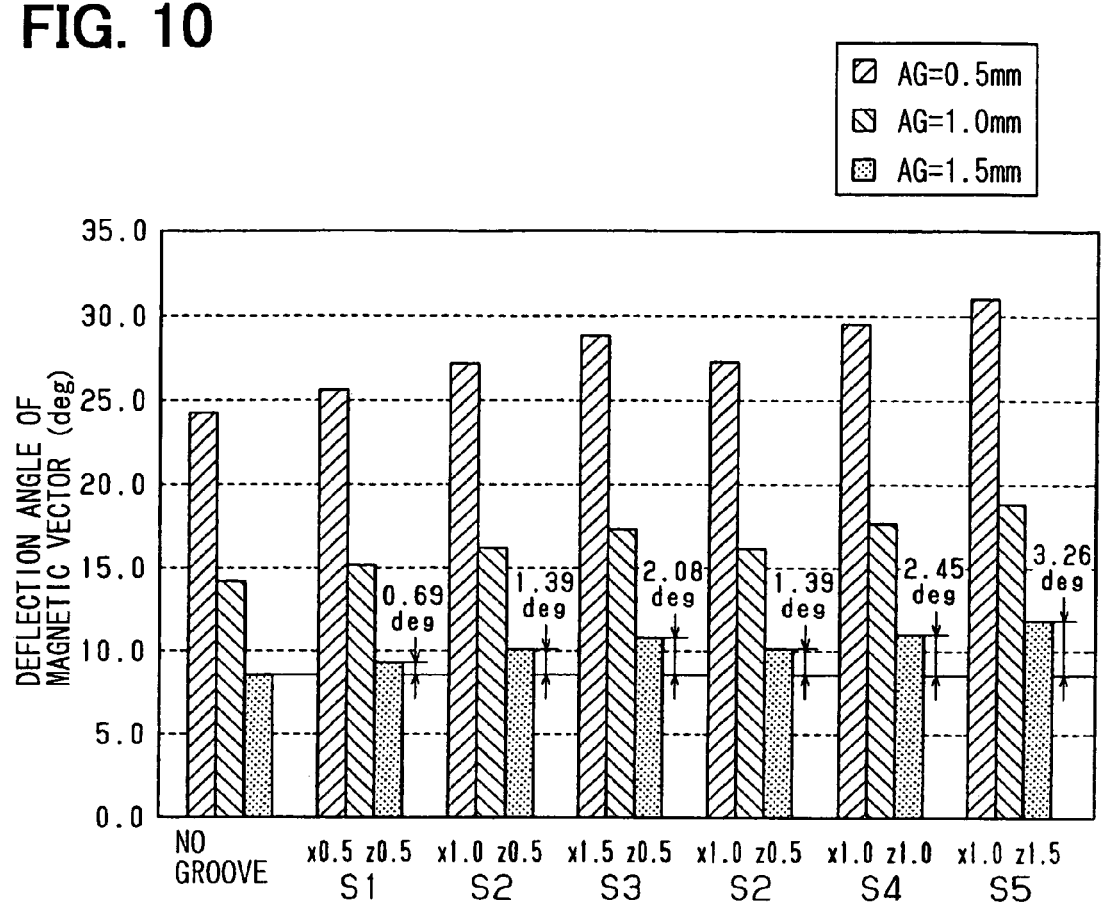
FIG. 10 is a graph explaining results of the second simulation, according to the first embodiment.
Figure 11:
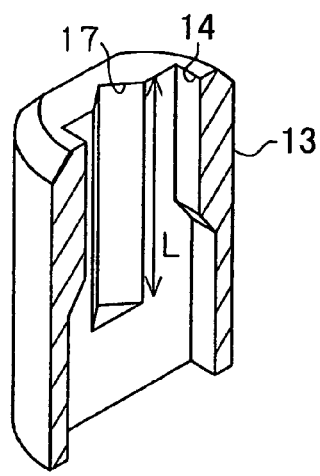
FIG. 11 is a perspective view showing a biasing magnet of the third simulation, according to the first embodiment.

FIG. 10 is a graph for indicating results of this second simulation. The graph of FIG. 10 clearly represents deflection angles of magnetic vectors as to the above-explained samples S1 to S5, and in addition, a deflection angle of a magnetic vector as to a biasing magnet where the triangular groove 17 is not formed, for the sake of comparisons. As apparent from the simulation results with respect to the samples Si to S3, which are graphically indicated in FIG. 10, the wider the width "X" of the triangular groove 17 is widened, the larger the deflection angle of the magnetic vector is increased. Also, as apparent from the simulation results with respect to the samples S2, S4, and S5, which are graphically indicated in FIG. 10, the deeper the depth "Z" of the triangular groove 17 is increased, the larger the deflection angle of the magnetic vector is increased. It should also be noted that angles which are attached among the respective graphs indicative of simulation results of these samples S1 to S5 correspond to such values for indicating how the deflection angles of the magnetic vectors as to the respective samples S1 to S5 have been enlarged when the air gaps AG thereof are equal to "1.5 mm" with respect to the deflection angle of the magnetic vector of the biasing magnet where the triangular groove 17 is not formed when the air gap AG thereof is selected to be similarly "1.5 mm." As also can be understood from these values, only as to the above-explained samples S1 to S5, if the depth "Z" of the triangular groove 17 is made large (deeper), then the deflection angle of the magnetic vector may be furthermore enlarged, as compared with such a case that the width "X" of the triangular groove 17 is made larger (wider).

[Third Simulation]

Next, a third simulation is explained. In this third simulation, analyzing operations were carried out as to deflection angles of the above-described magnetic vectors in such a case that a length "L" as to a triangular groove 17 was changed as exemplified in FIG. 11, not in the case that the triangular grooves 17 were formed in the entire portion of the biasing magnet 13 along the longitudinal direction thereof. It should be noted that while other shapes of the biasing magnet 13 are made equal to those of the previous first simulation, analyzing operations were carried out in such a case that the above-explained air gaps "AG" were three sorts of air gaps, namely, "0.5 mm"; "1.0 mm"; and "1.5 mm", respectively. It should also be noted that as a shape of a rotor "RT", the same shape as that of the first simulation is used, and analyzing operations were carried out while the above-described M-to-M distance is fixed to "1.3 mm."

FIG. 12 indicates results of this third simulation. As apparent from this FIG. 12, in any case that the air gap AG corresponds to "0.5 mm", "1.0 mm", and "1.5 mm", since the triangular groove 17 having the length "L" is formed in the biasing magnet 13, a deflection angle of a magnet vector is increased (see samples "U2" to "U5"), as compared with that of such a biasing magnet (namely, sample "U1") where the triangle groove 17 is not formed. However, a large change cannot be seen from deflection angles of magnetic vectors as to biasing magnets in which lengths "L" of triangle grooves 17 are longer than a certain length, concretely speaking, the lengths "L" become longer than "6.7 mm" of the sample U3. From the above-explained conditions, the following fact can be revealed: That is, in order that the triangular groove 17 is formed in the hollow portion 14 so as to enlarge the deflection angle of the magnetic vector, if such a triangular groove 17 having a certain length separated from the rotor opposing plane 13a of the biasing magnet 13 is formed in this hollow portion 14, then the sufficiently enlarged deflection angle of the magnetic vector can be obtained.

Also, in this third simulation, an analyzing operation was carried out in the case that one triangular groove 17 has been formed only in any one of inner side walls on the long edge sides of the hollow portion 14. In other words, as indicated as a sample U6 in FIG. 12, in the case that one triangular groove 17 has been formed only in any one of inner side walls on the long edge sides of the follow portion 14, a degree of enlarging a deflection angle of a magnetic vector thereof is lower than that of such a case that the triangular grooves 17 have been formed in the inner side walls on the side of the long edges of the hollow portion 14. However, the deflection angle of the magnetic vector of the first-mentioned biasing magnet 13 is enlarged, as compared with that of the conventional biasing magnet 13 (sample U1) where the triangular groove 17 is not formed. As apparent from the above-described simulation result, in order that the triangular grooves 17 are formed in the hollow portion 14 so as to enlarge the deflection angles of the magnetic vectors, there is a merit even in such a structure that one triangular groove 17 is formed only in one of these inner side walls of the hollow portion 14.

These results obtained in the first to third simulations will now be summarized as follows:

(a) Since the triangular grooves 17 are formed in the hollow portion 14 of the biasing magnet 13, the deflection angles of the magnetic vectors are enlarged.

(b) The wider the width "X" of the triangular groove 17 is widened, the larger the deflection angle of the magnetic vector is enlarged.

(c) The deeper the depth "Z" of the triangular groove 17 is increased, the larger the deflection angle of the magnetic vector is enlarged.

(d) As to the depth "Z" and the width "X" of the triangular groove 17, there is an advantage that if the depth "Z" is made deeper, then the deflection angle of the magnetic vector may be further enlarged.

(e) If the triangular groove 17 owns a certain length separated from the rotor opposing plane 13a of the biasing magnet 13, then a sufficiently large deflection angle of a magnetic vector may be obtained. Therefore, this triangular groove 17 is not always formed over the entire length of the biasing magnet 13.

(f) Even when the triangular groove 17 is formed only in one of the inner side walls of the hollow portion 14, the deflection angle of the magnetic vector may be enlarged.

As a consequence, in accordance with the above-described embodiment modes in which at least the above-explained structures (a) to (d) are employed, the below-mentioned effects can be achieved:

(1) While the relative positional relationship (for example, previously-explained "M-to-M" distance) among the magnetic resistance element pair 1, the magnetic resistance element pair 2, and the biasing magnet 13 is not always changed, the deflection angles of the magnetic vectors which are influenced to both the magnetic resistance element pairs 1 and 2 can be adjusted by the triangular grooves 17 formed in the hollow portion 14. Not only the deflection angles of the magnetic vectors may be enlarged in the above-described manner, but also the improvement of the sensing sensitivity as the rotation detecting apparatus may be easily realized. Moreover, the deflection angles of the magnetic vectors may be basically adjusted by arranging the triangular grooves 17 of the hollow portion 14, so that the freedom degree as to designing of this rotation detecting apparatus may be largely improved.

(2) Since the triangular grooves 17 are formed in the center portions of the inner side walls on the side of the long edges of the hollow portion 14, while the symmetrical characteristic as to the deflection angles of the magnetic vectors may be maintained, the deflection angles of the magnetic vectors can be easily adjusted, namely, can be readily enlarged.

(3) Since the triangular groove 17 whose sectional shape becomes the triangular shape is employed as the groove to be formed in the hollow portion 14, when the biasing magnet 13 is molded by employing a metal mold, fluidity owned by a magnetic material within this metal mold can be hardly blocked by the triangular groove 17. As a consequence, the magnetic material having better uniformity can be molded as the biasing magnet, as compared with that of such a case that a groove having another different shape is employed.

It should also be understood that the rotation detecting apparatus of the above-described embodiment modes may be modified as follows:

That is, in the above-explained embodiment modes, the triangular grooves 17 have been formed in the entire portion of the biasing magnet 13 along the longitudinal direction. Alternatively, when the content of the summarized item (e) as to the simulation results is considered, the triangular groove 17 may be formed in such a way that this triangular groove 17 has a certain length ("6.7 mm", in above example) separated from the rotor opposing plane 13a of the biasing magnet 13.

Similarly, when the content of the summarized item (f) as to the simulation results is considered, the triangular groove 17 may be alternatively formed in such a way that this triangular groove 17 is formed only in one of the inner side walls which constitutes the hollow portion 14 of the biasing magnet 13.

Figure 13:
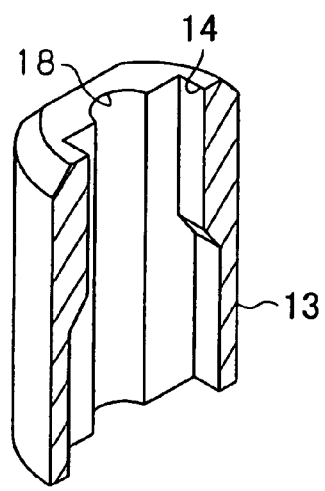
FIG. 13 is a perspective view showing a biasing magnet according to a first modification of the first embodiment.
Figure 14:
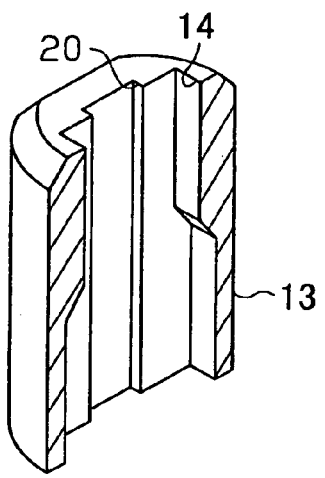
FIG. 14 is a perspective view showing a biasing magnet according to a second modification of the first embodiment.

In the above-described embodiment modes, such a biasing magnet 13 that the triangular grooves 17 have been formed in the hollow portion 14 has been exemplified. Alternatively, instead of the above-described triangular grooves 17, for instance, as shown in FIG. 13 which corresponds to the previous drawing of FIG. 3, such a biasing magnet 13 may be alternatively employed in which a semi-circular groove 18 has been formed, and a groove bottom portion of this semi-circular groove 18 has been made in an arc shape. Also, similar to the above modification, as represented in FIG. 14 which corresponds to the previous drawing of FIG. 3, such a biasing magnet 13 may be alternatively employed in which a rectangular groove 20 has been formed and a groove bottom portions of this rectangular groove 20 has been formed in a rectangular shape. Analyzed results of deflection angles of magnetic vectors as to either the biasing magnet 13 which has employed the semi-circular grooves 18 or the biasing magnet 13 which has employed the rectangular grooves 20 will now be explained with reference to FIG. 15. As represented in the analyzed results of FIG. 15, the deflection angles of the magnet vectors as to the biasing magnet 13 (sample V1) where the semi-circular grooves 18 have been formed are also enlarged, as compared with the deflection angles of the magnetic vectors as to the biasing magnet (sample U1 of FIG. 12) where the triangular grooves 17 have not been formed. Moreover, a degree of the enlarged deflection angles becomes larger than that of such a biasing magnet (sample V4) where the triangular grooves 17 having the same widths "X", the same depths "Z", and the lengths "L" have been formed. As a consequence, since the semi-circular grooves 18 are formed, the deflection angles of the magnetic vectors may be enlarged at the same degree, or higher degree than that of the above-explained triangular grooves 17. In addition, the sensing sensitivity may be further improved. Also, in the case that this semi-circular groove 18 is employed in the biasing magnet 13, similar to such a case that the above-described triangular groove 17 is employed in the biasing magnet 13, there is a merit that fluidity of a magnet material used when this biasing magnet 13 is molded can be hardly blocked. On the other hand, the deflection angles of the magnet vectors as to the biasing magnets (samples V2 and V3) where the rectangular grooves 20 have been formed are also enlarged, as compared with the deflection angles of the magnetic vectors as to the biasing magnet (sample U1 of FIG. 12) where the triangular grooves 17 have not been formed. Then, in this case, more specifically, the depth "Z" of this rectangular groove 20 is made equal to, or deeper than the depths of other grooves, so that the following fact can be revealed from the analyzed results of FIG. 15. That is, an enlarging degree of the deflection angles of the magnetic vectors may become larger than the enlarging degrees of the deflection angles of the magnetic vectors as to the biasing magnet in which the triangular grooves 17, or the semi-circular grooves 18 has been formed. As a consequence, as shapes of grooves, not only the above-explained triangular grooves 17, but also the semi-circular grooves 18 and the rectangular grooves 20 may be properly employed. The Inventors of the present invention could confirm that the contents of the above-explained summarized items (a) to (f) with respect to the first to third simulation results may be similarly applied to these semi-circular grooves 18 and the rectangular grooves 20.

Figure 16:
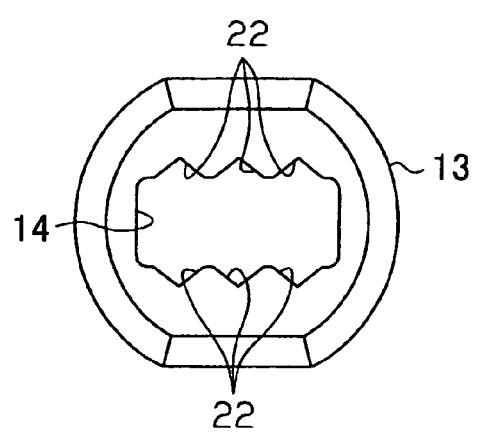
FIG. 16 is a plan view showing a biasing magnet according to a third modification of the first embodiment.

In the above-described embodiment mode, such a biasing magnet 13 has been exemplified in which one of the triangular grooves 17 has been formed in each of the inner side walls of the hollow portion 14 on the side of the long edges thereof. For example, as shown in FIG. 16, such a biasing magnet 13 may be alternatively employed in which a plurality of triangular grooves 23 (for instance, three triangular grooves 22) have been formed in each of inner side walls thereof on he long edge side. Also in this alternative case the inventors of the present invention could confirm that similar operation effects to those of the above-described embodiment modes may be achieved.

Also, in the above-described embodiment mode, the triangular groove 17 has been formed in the center portion of the inner side wall of the hollow portion 14 on the long edge side. However, the position where this triangular groove 17 is formed may be alternatively selected to be any positions if these positions are located within the hollow portion 14. In this alternative case, although the symmetrical characteristic as to the deflection angles of the magnetic vectors cannot be maintained, the deflection angles of the magnetic vectors may be easily adjusted, namely may be readily enlarged in a similar manner to that of the above-explained embodiment mode.

(Second Embodiment)

Prior to descriptions as to a second embodiment mode of a rotation detecting apparatus according to the present invention, a basic idea of the present invention will now be explained with reference to FIG. 19 to FIG. 21. It should be understood that for the sake of easy understandings, such a conventional rotation detecting apparatus which employs a biasing magnet is employed as an example, and a portion of this biasing magnet is indicated in an enlarging manner. In this biasing magnet, magnetic field strengths have been substantially uniformly set over an entire peripheral portion of the own biasing magnet. For the sake of convenience, the same reference numerals shown in the previous drawing of FIG. 17, or FIG. 18 will be employed as those for indicating the same, or similar structural elements indicated in FIG. 19 to FIG. 21.

Figure 19:
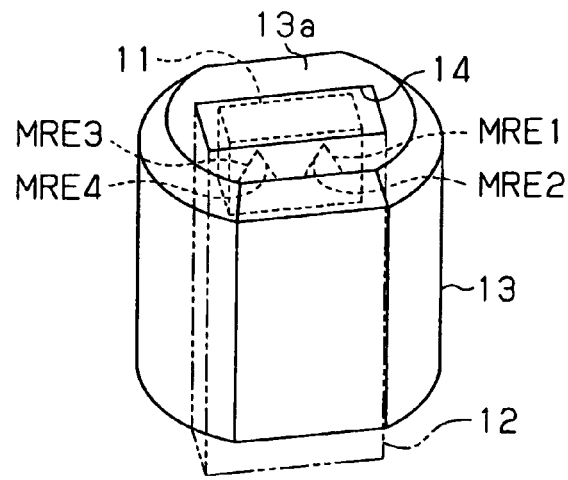
FIG. 19 is a perspective view showing a bias magnet and a sensor chip in rotation detecting apparatus according to the second embodiment of the present invention.

FIG. 19 shows a perspective structure of a sensor chip 11 and a biasing magnet 13 in an enlarging manner, which constitute the rotation detecting apparatus. As indicated in FIG. 19, the biasing magnet 13 has been formed in a hollow cylindrical shape and has been equipped with a hollow portion 14, while a sectional shape of the hollow portion 14 along a direction perpendicular to a longitudinal direction of this biasing magnet 13 is made of a rectangular shape. The sensor chip 11 having magnetic resistance elements "MRE1" to "MRE4" has been stored into the hollow portion 14 in combination with a molding member 12, so that a biasing magnetic field may be applied from the biasing magnet 13 with respect to the magnetic resistance elements MRE1 to MRE4 of this stored sensor chip 11. It should also be noted that in this biasing magnet 13, an edge plane 13a located opposite to the above-explained rotor has been magnetized as an "N pole", whereas another edge plane located opposite to the edge plane 13a has been magnetized as an "S pole."

Figure 20:
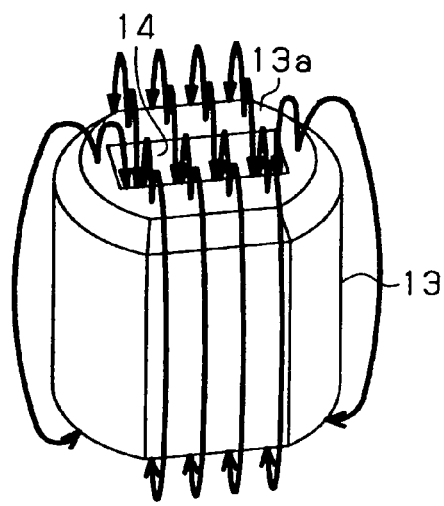
FIG. 20 is a perspective view showing magnetic flux of a bias magnet, according to a comparison of the second embodiment.

While employing the enlarged perspective view of the biasing magnet 13, conditions of magnetic fields which are generated from the biasing magnet 13 are illustratively shown in FIG. 20. For the sake of convenience, it should also be noted that in FIG. 20, magnetic fields on the side of long edges of the hollow portion 14 are represented by arrows denoted by 8 solid lines, and also, magnetic fields on the side of short edges of the hollow portion 14 are represented by arrows denoted by 2 solid lines. In the below-mentioned descriptions, high/low strengths of magnetic fields will be indicated based upon widthnesses of solid lines. However, as previously explained, since the magnetic field strengths of this biasing magnet 13 shown in FIG. 20 are substantially equal to each other over the entire peripheral portion thereof, the above-explained magnetic fields may be represented by all of solid lines having the same widthness. As indicated in FIG. 20, in a single body of this biasing magnet 13, magnetic fields generated from this single biasing magnet 13 are converged in a ring shape in such a mode that the magnetic fields are directed from the N pole to the S pole. However, when the tooth portion of the above-described rotor passes in opposite to the edge plane 13a of the biasing magnet 13, magnetic vectors may be produced at this tooth portion in such a condition that the magnetic fields are drawn. Then, changes contained in angles of the produced magnetic vectors may be sensed by the magnetic resistance elements MRE1 to MRE4 as changes contained in resistance values.

On the other hand, in the above-described rotation detecting apparatus, the angle changes of the magnetic vectors which are produced when the above-explained rotor is rotated may be sensed as the changes contained in the resistance values of the above-described magnetic resistance elements MRE1 to MRE4. In the case of the biasing magnet 13 shown in FIG. 20, all of the magnetic fields produced from this biasing magnet 13 may contribute to the generations of the above-explained magnetic vectors. As a consequence, in particular, the deflection angles of the magnetic vectors which are generated may also be limited by the magnetic fields produced on the side of the long edges of the hollow portion 14. Referring now to FIG. 21, a detailed description is made of the above-described limitations as to the deflection angles of the magnetic vectors.

Figure 21:
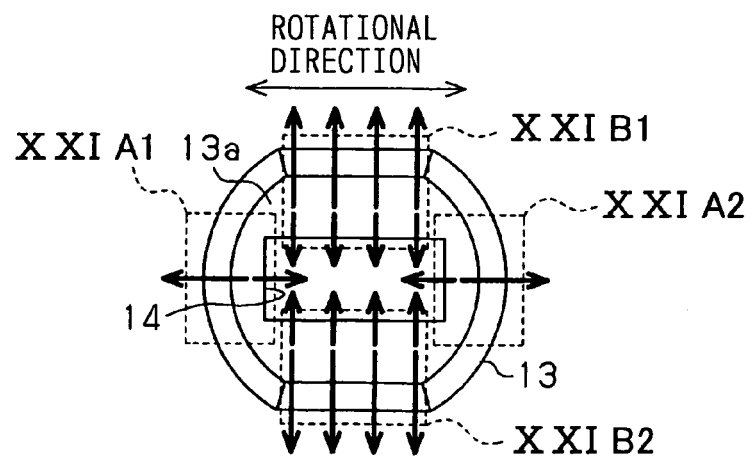
FIG. 21 is a plan view showing the magnetic flux of the biasing magnet, according to the comparison of the second embodiment.

FIG. 21 illustratively shows conditions of magnetic fields which are produced from the biasing magnet 13 by employing a plane view of the biasing magnet 13 which is viewed from the side of the edge plane 13a located opposite to the above-explained rotor. As represented in FIG. 21, such magnetic fields which are produced from a portion "XXIA1" and another portion "XXIA2" on the side of the short edges of the hollow portion 14 are easily influenced by rotations of the rotor, if an attention is paid only to the magnetic fields which are generated from these portions XXIA1 and XXIA2, then magnetic vectors may be readily deflected which are produced by these generated magnetic fields in conjunction with the rotations of the rotor. In other words, deflection angles thereof are largely maintained by the own deflection angles. To the contrary, magnetic fields which are generated from a portion XXIB1 and another portion XXIB2 on the side of the long edges of the hollow portion 14 are intersected perpendicular to the rotation direction of the rotor. As a result, components of such magnetic vectors which are produced by the magnetic fields generated from these portions XXIB1 and XXIB2 in conjunction with the rotations of the rotor may give such an effect that the easy deflections of the above-explained magnetic vectors which are produced by the magnetic fields generated from the portions XXIA1 and XXIA2 in conjunction with the rotation of the rotor may be blocked. In other words, if the magnetic field strengths of the magnetic fields can be lowered which are generated from the portions XXIB1 and XXIB2 on the side of the long edges of the hollow portion 14, then an enlargement of the deflection angles of the above-explained magnetic vectors can be expected.

Figure 22:
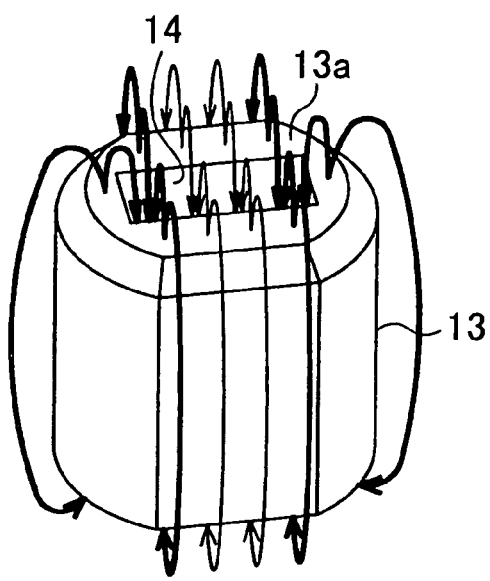
FIG. 22 is a perspective view showing magnetic flux of a biasing magnet, according to the second embodiment.
Figure 23:
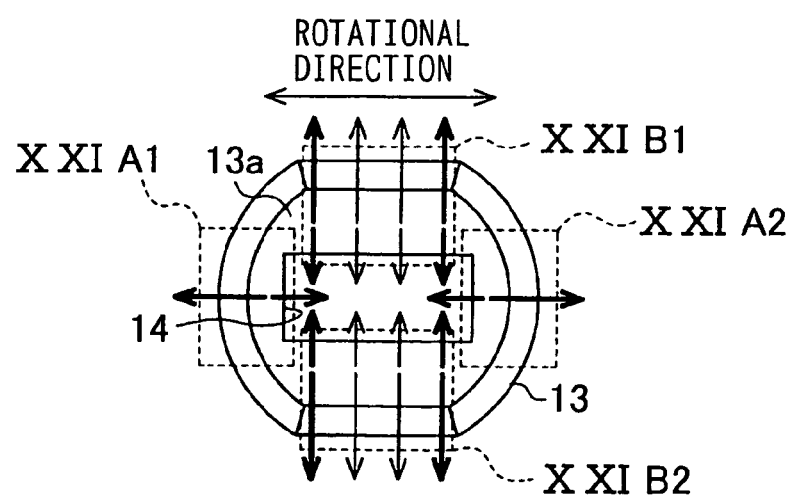
FIG. 23 is a plan view showing the magnetic flux of the biasing magnet, according to the second embodiment.
Figure 24:
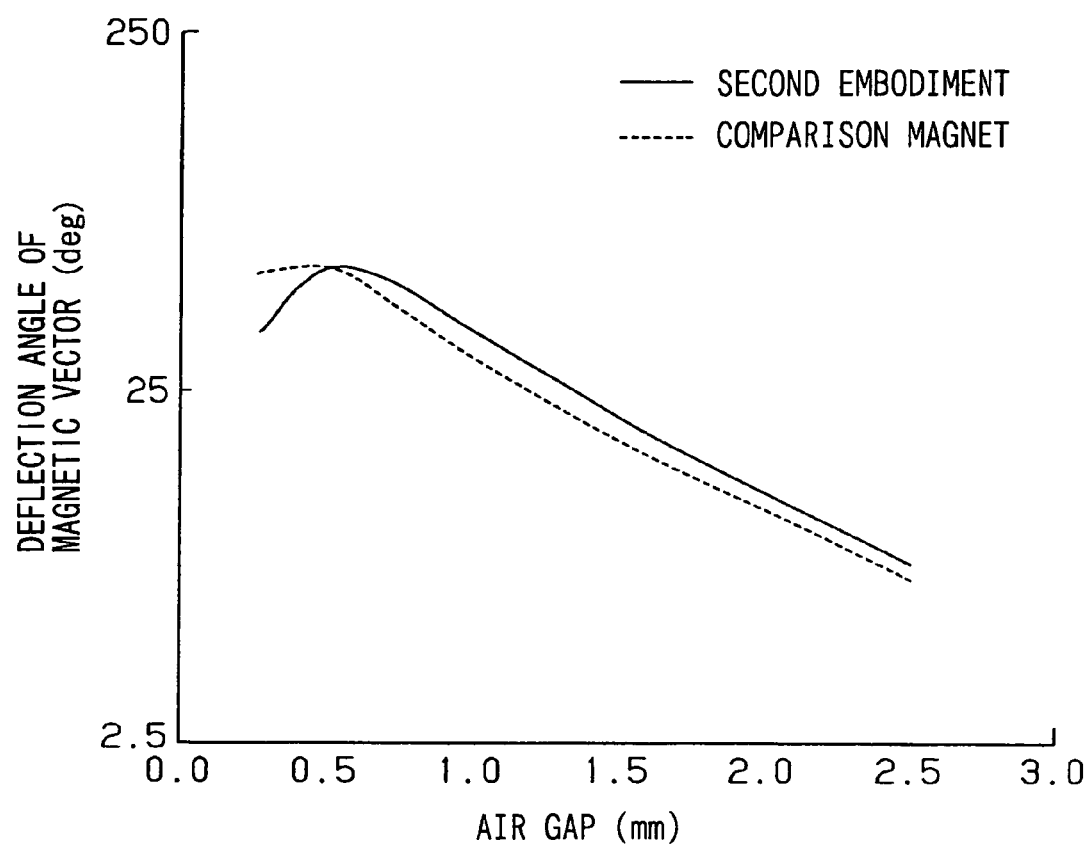
FIG. 24 is a graph showing a relationship between an air gap and a deflection angle of a magnetic vector obtained by the second embodiment and the comparison of the second embodiment.

FIG. 22 to FIG. 24 show a rotation detecting apparatus according to a second embodiment mode of the present invention, while the rotation detecting apparatus has been arranged based upon the above-described basic idea. Referring now to FIG. 22 to FIG. 24, an arrangement of the rotation detecting apparatus according to this second embodiment mode will be described in detail. It should be noted that since a structure as the rotation detecting apparatus is basically identical to the above-described structure of the conventional rotation detecting apparatus, the same reference numerals shown in this conventional rotation detecting apparatus will be employed as those for denoting structural elements having the same, or similar functions, and thus, detailed descriptions thereof are omitted.

FIG. 22 illustratively indicates conditions of magnetic fields which are generated from a biasing magnet 13 employed in the rotation detecting apparatus according to the first embodiment mode, and this drawing corresponds to FIG. 20. As shown in FIG. 22, the biasing magnet 13 has been formed in a hollow cylindrical shape and has been provided with a hollow portion 14. This hollow cylindrical shape of the biasing magnet 13 is not completely different from the shape of the conventional biasing magnet. A sectional shape of the hollow portion 14 is made in a substantially rectangular shape along a direction perpendicular to a longitudinal direction of the biasing magnet 13. Also, a material for constructing the biasing magnet 13 is the same material as the conventional biasing magnet. However, this biasing magnet 13 owns the below-mentioned different point from the conventional biasing magnet whose the magnetic strengths have been substantially uniformly set. That is, in this biasing magnet 13, magnetic strengths of biasing magnet portions which are located opposite to front/rear arranging planes of the magnetic resistance elements MRE1 to MRE4 in the sensor chip 11 (see FIG. 19) stored in the hollow portion 14 have been selectively set to low magnetic field strengths from an edge plane 13a of this biasing magnet 13 to an opposing plane thereof. This edge plane 13a is located opposite to the rotor. As a consequence, among the magnetic fields generated from the biasing magnet 13, the magnetic fields which are generated from the biasing magnet portions located opposite to the front/rear arranging planes of the magnetic resistance elements MRE1 to MRE4 are indicated by arrows made of narrow solid lines, as compared with magnetic fields which are generated from other portions of this biasing magnet 13.

FIG. 23 illustratively shows conditions of magnetic fields which are produced from the biasing magnet 13 by employing a plan view of the biasing magnet 13 which is viewed from the side of the edge plane 13a located opposite to the above-explained rotor, which corresponds to the drawing of FIG. 21. As represented in FIG. 23, if an attention is paid to magnetic fields which are generated from a portion "XXIA1" and another portion "XXIA2" on the side of short edges of the hollow portion 14 within the biasing magnet 13, similar to the previously explained biasing magnet 13 (see FIG. 21), then magnetic vectors may be readily deflected which are produced by these generated magnetic fields in conjunction with the rotations of the rotor, and thus, deflection angles thereof are largely secured. To the contrary, within the biasing magnet 13, field strengths of such magnetic fields which are generated from the biasing magnet portions located opposite to the front/rear arranging planes of the magnetic resistance elements MRE1 to MRE4, namely, field strengths of magnetic fields which are generated from a portion "XXIB1" and another portion "XXIB2" on the side of the long edges of the hollow portion 14 have been selectively set to low field strengths, which are different from those of the previously explained biasing magnet 13. As a result, such magnetic vectors which are produced by the magnetic fields generated from these portions XXIB1 and XXIB2 in conjunction with the rotations of the rotor may be easily deflected, as compared with those produced from the previously explained biasing magnet 13. Accordingly, such magnetic vectors may be suppressed which may block easy deflections of the above-described magnetic vectors which are produced by the magnetic fields generated from the portions XXIA1 and XXIA2 in conjunction with the rotation of the rotor. Then, as a consequence, the components of the magnetic vectors can be relatively strengthened, which are produced by the magnetic fields generated from this biasing magnet 13 in conjunction with the rotations of the rotor.

FIG. 24 represents a simulation result as to deflection angles of magnetic vectors which are produced from the magnetic fields generated from the biasing magnet 13 in conjunction with the rotations of the rotor, while the sensitivities of the magnetic resistance elements MRE1 to MRE4 have been considered. It should be understood that air gaps indicated in FIG. 24 represent distances between the rotor and a rotor opposing plane of a rotation detecting apparatus in the case that this rotation detecting apparatus has been arranged as shown in FIG. 18. As apparent from this drawing, the deflection angles of the magnetic vectors produced in the case that the biasing magnet 13 is employed may exceed the simulation results about the magnetic vector deflection angles obtained in such a case that the conventional biasing magnet 13 is employed in substantially all of the air gaps. As a consequence, since the biasing magnet 13 is employed in which the magnetic field strengths of the portions located opposite to the front/rear arranging planes of the magnetic resistance elements MRE1 to MRE4 have been selectively set to the low magnetic field strengths, it is extremely effective so as to enlarge the deflection angles of the magnetic vectors.

Next, a method of manufacturing the above-explained biasing magnet 13 will now be explained with reference to FIG. 25 to FIG. 28.

Normally, when a biasing magnet is manufactured, a molded body of a resin material which contains magnetic powder is formed, and then, this molded body of the resin material is magnetized. However, the above-explained biasing magnet 13 is featured by that the magnetic field strengths of the portions located opposite to the front/rear arranging planes of the magnetic resistance elements MRE1 to MRE4 have been selectively set to the low magnetic field strengths. As a consequence, in the below-indicated molding apparatus, while orientation modes of the magnetic powder contained in the above-described molded body are made different from each other, the above-explained magnetic field strengths are set in accordance with such differences in the orientation modes. Subsequently, the molding apparatus capable of executing such a molding step is described in detail.

Figure 25:
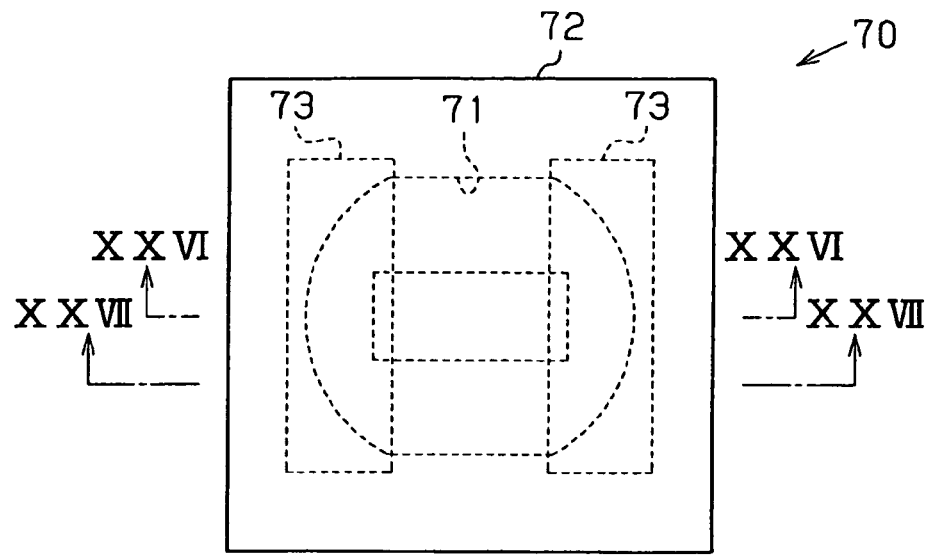
FIG. 25 is a plan view showing manufacturing equipment of the biasing magnet, according to the second embodiment.

FIG. 25 is a plan view for showing a molding apparatus 70 which forms the above-described molded body. As represented in FIG. 25, this molding apparatus 70 has been arranged by employing a molding die 72 which has a cavity 71 corresponding to the shape of the biasing magnet 13. It should also be noted that this molding die 72 is manufactured by a non-magnetic material. Also, this molding apparatus 70 has been constituted by providing two sets of energizing coils 73 at upper and lower portions of the cavity 71. These two energizing coils 73 may cover the cavity 71 except for such cavity portions corresponding to the above-described magnet portions XXIB1 and XXIB2.

Figure 26:
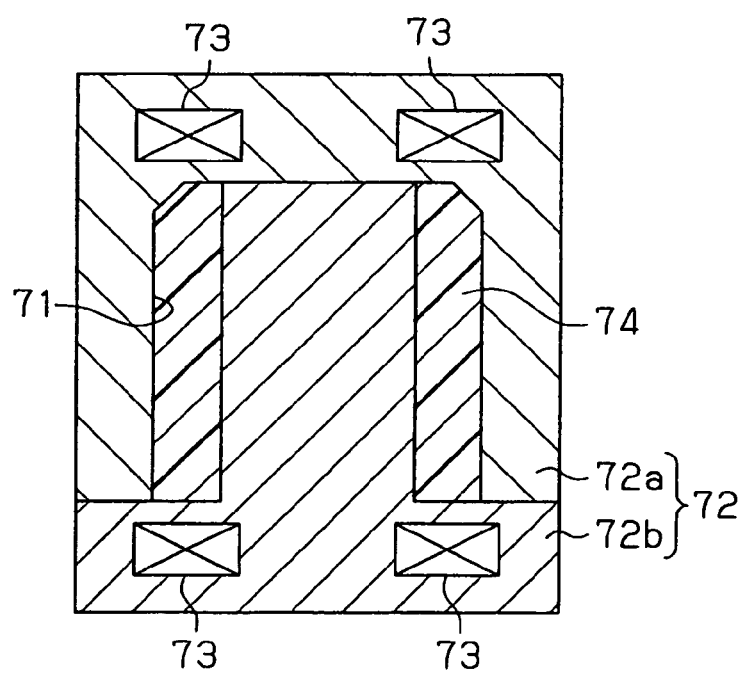
FIG. 26 is a cross sectional view showing the equipment taken along line XXVI—XXVI in FIG. 25.

FIG. 26 is a sectional view for representing the molding apparatus 70 which is cut along a line XXVI—XXVI shown in FIG. 25. As indicated in FIG. 26, the molding die 72 is constituted by an upper die 72a and a lower die 72b, and a molded body 74 is formed within the cavity 71 between the upper die 72a and the lower die 72b. Two sets of the energizing coils 73 having the above-described modes have been arranged in each of the upper die 72a and the lower die 72b.

Next, a description is made of the method for manufacturing the above-described biasing magnet 13 with employment of the molding apparatus 70 arranged in the above-described manner.

In other words, in the case that the biasing magnet 13 is manufactured by employing the above-described molding apparatus 70, the below-mentioned manufacturing steps are executed:

(a) A resin material containing magnetic powder is injected into the cavity 71 of the molding die 72. It should be understood that this injection of the resin material is carried out via a spool (not shown).

(b) While the respective energizing coils 73 are energized so as to apply proper magnetic fields with respect to the magnetic powder of the resin material filled in the cavity 71, the orientation of the magnetic powder is controlled before the resin material is solidified.

(c) After the above-described resin material has been solidified as a molded body, the entire portion of this molded body is once demagnetized.

(d) Thereafter, a portion of the molded body, which is located opposite to the rotor, is magnetized as an "N pole", whereas another portion of the molded body, which is located opposite to the first-mentioned portion, is magnetized as an "S pole" by using a magnetizing apparatus (not shown).

Figure 27:
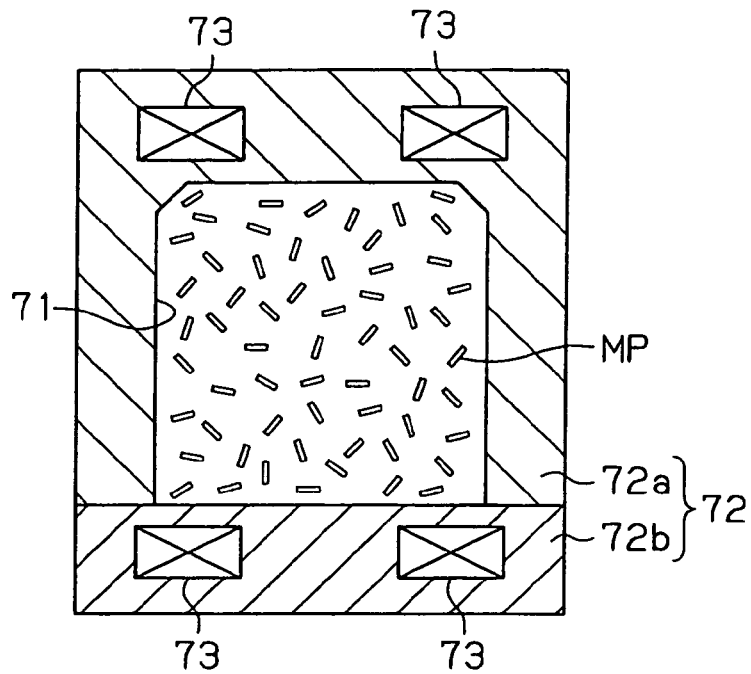
FIG. 27 is a cross sectional view explaining orientation of magnetic powder before the orientation is controlled, according to the second embodiment.
Figure 28:
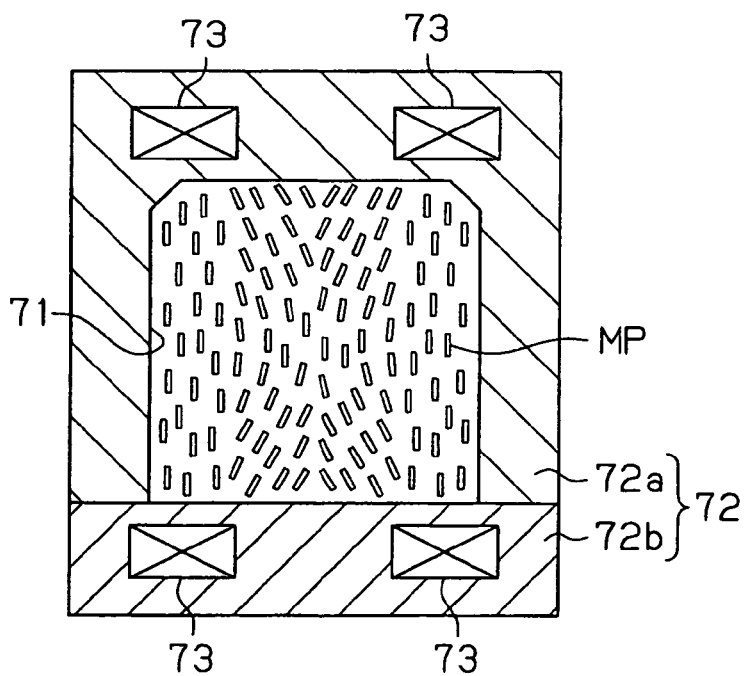
FIG. 28 is a cross sectional view explaining orientation of magnetic powder after the orientation is controlled, according to the second embodiment.

Now, a further detailed explanation is made of the above-explained manufacturing step (b). FIG. 27 shows an orientation mode of the magnetic powder before the orientation of this magnetic powder is controlled with employment of a sectional diagram of the above-described forming apparatus 70 which is cut along a line XXVII—XXVII shown in FIG. 25. Also, FIG. 28 indicates an orientation mode of the magnetic powder after the orientation of the magnetic powder has been controlled, and corresponds to the drawing of FIG. 27. It should also be noted that in FIG. 27 and FIG. 28, in order to easily understand the orientation modes of the magnetic powder, the magnetic powder is displayed in an enlarging manner. As indicated in FIG. 27, under such a condition obtained before the energizing coils 73 are energized, orientation of magnetic powder MP present in the resin material is brought into unmatched condition. In contrast to this unmatched condition, when the respective energizing coils 73 are energized so that magnetic fields are produced around the respective energizing coils 73, as indicated in FIG. 28, the orientation of the magnetic powder MP is controlled in correspondence with these generated magnetic fields. In other words, the orientation of the magnetic powder MP may be realized in such a way that the particles of the magnetic powder MP are directed to the respective energizing coils 73. As a result, in the molded body which is manufactured by the molding apparatus 70, orientation degrees of the magnetic powder MP of such portions thereof which correspond to the above-described magnet portions XXIB1 and XXIB2 are made lower, so that there is a difference in the orientation modes of the magnetic power MP within this molded body. Then, since the molded body having such different orientation modes is magnetized by way of the above-described manufacturing steps (c) and (d), the biasing magnet 13 which generates the previously explained magnetic fields shown in FIG. 22 and FIG. 23 can be manufactured.

Then, the above-described sensor chip 11 is stored in combination with the molding member 12 (see FIG. 19) into the hollow portion 14 of the biasing magnet 13 which has been manufactured via the above-described manufacturing steps (a) to (d), and thereafter, the stored structural members are assembled with a case member, and the like, in an integral manner. As a result, the rotation detecting apparatus shown in FIG. 18 may be manufactured.

In the above-described first embodiment mode, the below-listed effects can be achieved:

(1) The biasing magnet 13 has been formed in such a manner that the magnetic strengths of the biasing magnet portions (above-described portions XXIB1 and XXIB2) which are located opposite to the front/rear arranging planes of the magnetic resistance elements MRE1 to MRE4 have been selectively set to the low magnetic field strengths from the edge plane 13a of this biasing magnet 13 to the opposing plane thereof. As a consequence, the magnetic field strengths at the plane where the magnetic vectors are changed may be selectively set to the low magnetic field strengths. As a result, the components of the magnetic vectors can be relatively strengthened which are produced by the biasing magnetic fields generated from the biasing magnet 13 in conjunction of the rotations of the rotor. In other words, while a relative positional relationship (for example, previously-explained "M-to-M" distance) among the magnetic resistance elements MRE1 to MRE4 and the biasing magnet 13 is not always changed, the deflection angles of the magnetic vectors which give influences to the magnetic resistance elements MRE1 to MRE4 can be adjusted, and also, the improvement of the sensing sensitivity as the rotation detecting apparatus may be easily realized.

(2) While the biasing magnet 13 may be formed as the molded body of the resin material which contains the magnetic powder, the magnetic field strengths as to the portions which are located opposite to the front/rear planes of the magnetic resistance elements MRE1 to MRE4 are selectively set to the low magnetic field strengths in accordance with the differences in the orientation modes of the magnetic powder in the molded body. As a consequence, the above-explained magnetic field strengths can be simply set by suitably utilizing the structure as the above-explained molded body. Also, since the conventional magnet material may be directly utilized, increasing of the manufacturing cost may be suppressed.

(Third Embodiment)

Figure 29:
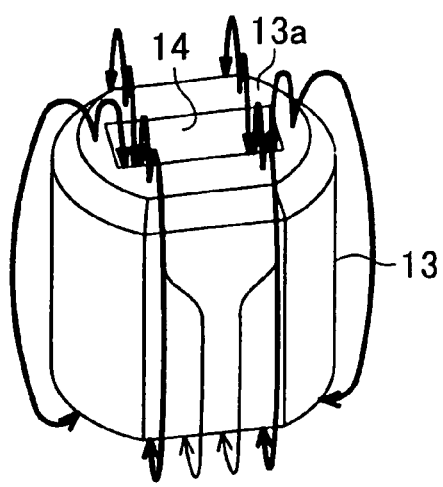
FIG. 29 is a perspective view showing magnetic flux of a bias magnet, according to a third embodiment of the present invention.

FIG. 29 shows a rotation detecting apparatus according to a third embodiment mode of the present invention, while the rotation detecting apparatus has been arranged based upon the above-described basic idea. Referring now to FIG. 29, an arrangement of the rotation detecting apparatus according to this third embodiment mode will be described in detail. It should be noted that since a structure as the rotation detecting apparatus is basically identical to the above-described structure of the conventional rotation detecting apparatus, the same reference numerals shown in this conventional rotation detecting apparatus will be employed as those for denoting structural elements having the same, or similar functions, and thus, detailed descriptions thereof are omitted.

FIG. 29 illustratively indicates conditions of magnetic fields which are generated from a biasing magnet 13 employed in the rotation detecting apparatus according to the first embodiment mode, and this drawing corresponds to FIG. 20. As shown in FIG. 29, the biasing magnet 13 has been formed in a hollow cylindrical shape and has been provided with a hollow portion 14. This hollow cylindrical shape of the biasing magnet 13 is not completely different from the shape of the conventional biasing magnet. A sectional shape of the hollow portion 14 is made in a substantially rectangular shape along a direction perpendicular to a longitudinal direction of the biasing magnet 13. Also, a material for constructing the biasing magnet 13 is the same material as the conventional biasing magnet. However, this biasing magnet 13 owns the below-mentioned different point from the conventional biasing magnet. That is, in this biasing magnet 13, magnetic strengths of biasing magnet portions which are located opposite to front/rear arranging planes of the magnetic resistance elements MRE1 to MRE4, namely magnetic strengths of magnetic fields as to the above-explained portions XXIB1 and XXIB2 (see FIG. 21) have been selectively set to low magnetic field strengths from an edge plane 13a located opposite to the rotor up to such a position which covers the magnetic resistance elements MRE1 to MRE4 of the sensor chip 11. As a consequence, the magnetic fields which are generated from the biasing magnet portions whose magnetic field strengths have been selectively set to the low magnetic field strengths are indicated by arrows made of narrow solid lines, as compared with magnetic fields which are generated from other portions of this biasing magnet 13.

Then, if an attention is paid to magnetic fields which are generated from the portion "XXIA1" and another portion "XXIA2" (see FIG. 21) on the side of the short edges of the hollow portion 14 within the biasing magnet 13, similar to the previously explained biasing magnet 13 (see FIG. 21), then magnetic vectors may be readily deflected which are produced by these generated magnetic fields in conjunction with the rotations of the rotor, and thus, deflection angles thereof are largely secured. To the contrary, within the biasing magnet 13, field strengths of such magnetic fields which are generated from the portions XXIB1 and XXIB2 over the positions for covering the magnetic resistance elements MRE1 to MRE4 from the above-described edge plane 13a have been selectively set to low field strengths, which are different from those of the previously explained biasing magnet 13. As a result, such magnetic vectors which are produced by the magnetic fields generated from these portions XXIB1 and XXIB2 in conjunction with the rotations of the rotor may be easily deflected, as compared with those produced from the previously explained biasing magnet 13. Accordingly, such magnetic vectors may be suppressed which may block easy deflections of the above-described magnetic vectors which are produced by the magnetic fields generated from the portions XXIA1 and XXIA2 in conjunction with the rotations of the rotor. Then, as a consequence, the components of the magnetic vectors can be relatively strengthened, which are produced by the magnetic fields generated from this biasing magnet 13 in conjunction with the rotations of the rotor.

Next, a method of manufacturing the above-explained biasing magnet 13 will now be explained with reference to FIG. 30 and FIG. 31. It should be understood that since the biasing magnet 13 is basically manufactured by way of the same manufacturing steps as those indicated in the above-described first embodiment mode, different points thereof will be mainly explained.

Figure 30:
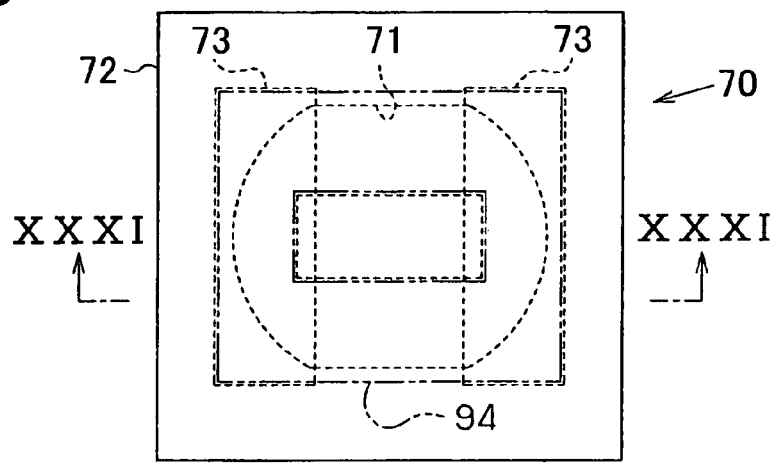
FIG. 30 is a plan view showing manufacturing equipment of the biasing magnet, according to the third embodiment.

FIG. 30 shows a molding apparatus 70 for molding the above-explained biasing magnet 13, and corresponds to the drawing of FIG. 25. As indicated in FIG. 30, this molding apparatus 70 has been arranged by employing a molding die 72 which has a cavity 71 corresponding to the shape of the biasing magnet 13. It should also be noted that this molding die 72 is manufactured by a non-magnetic material. Then, two sets of energizing coils 73 have been arranged in an upper molding die 72a (see FIG. 31) for constituting this molding die 72, while these two energizing coils 73 may cover the cavity 71 except for such cavity portions corresponding to the above-described magnet portions XXIB1 and XXIB2. To the contrary, an energizing coil 94 which covers the cavity 71 has been arranged in a lower molding die 72b (see FIG. 31) which constitutes the molding die 72. Thus, orientation of the above-explained magnetic powder may be controlled by operating these energizing coils 73 and energizing coil 94.

Figure 31:
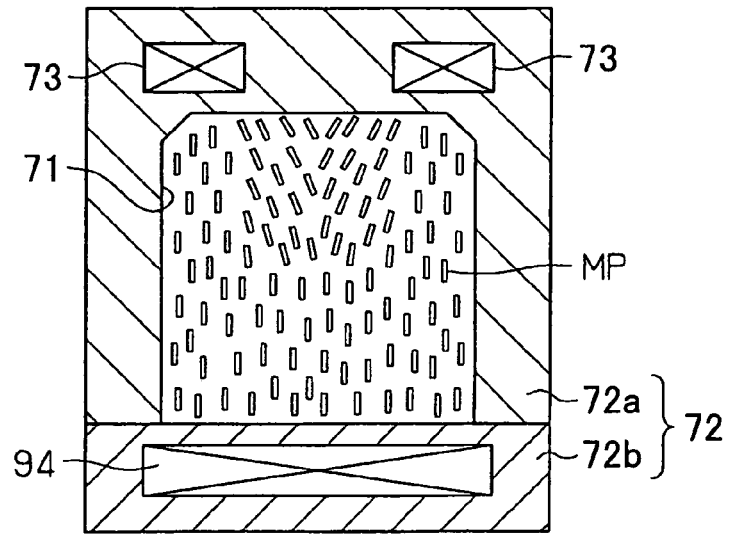
FIG. 31 is a cross sectional view explaining orientation of magnetic powder after the orientation is controlled, according to the third embodiment.

FIG. 31 indicates an orientation mode of the magnetic powder after the orientation of the magnetic powder has been controlled, and corresponds to the drawing of FIG. 28. When the respective energizing coils 73 and 94 are energized so that magnetic fields are produced around the respective energizing coils 73 and 94, as indicated in FIG. 31, the orientation of the magnetic powder MP is controlled in correspondence with these generated magnetic fields. In other words, the orientation of the magnetic powder MP may be realized in such a way that the particles of the magnetic powder MP are directed to the respective energizing coils 73 and 94. As a result, in the molded body which is manufactured by the molding apparatus 70, orientation degrees of the magnetic powder MP of such portions thereof which correspond to the above-described magnet portions XXIB1 and XXIB2 over the positions for covering the magnetic resistance elements MRE1 to MRE4 from the above-described edge plane 13a of the biasing magnet 13 are made lower, so that there is a difference in the orientation modes of the magnetic power MP within this molded body. Then, since the molded body having such different orientation modes is magnetized by way of the above-described manufacturing steps (c) and (d), the biasing magnet 13 which generates the previously explained magnetic fields shown in FIG. 29 can be manufactured.

In accordance with the above-explained second embodiment mode, the below-mentioned effect can be obtained in addition to such effects which are equivalent to the above-explained effects (1) and (2) of the second embodiment modes.

(3) The biasing magnet 13 has been formed in such a manner that the magnetic strengths of the biasing magnet portions (above-described portions XXIB1 and XXIB2) which are located opposite to the front/rear arranging planes of the magnetic resistance elements MRE1 to MRE4 have been selectively set to the low magnetic field strengths from the edge plane 13a of this biasing magnet 13 which are located to the rotor over the positions which cover the magnetic resistance elements MRE1 to MRE4. As a result, the orientation controls of the magnetic powder as to such portions except for the portions which are defined from the edge plane 13a located opposite to the rotor up to the positions which cover the magnetic resistance elements MRE1 to MRE4 may be realized in a similar control manner to the prior art, so that increasing of the manufacturing cost can be suppressed by applying the conventional molding die.

It should also be noted that the above-described respective embodiment modes may be alternatively modified so as to be carried out.

Figure 32:
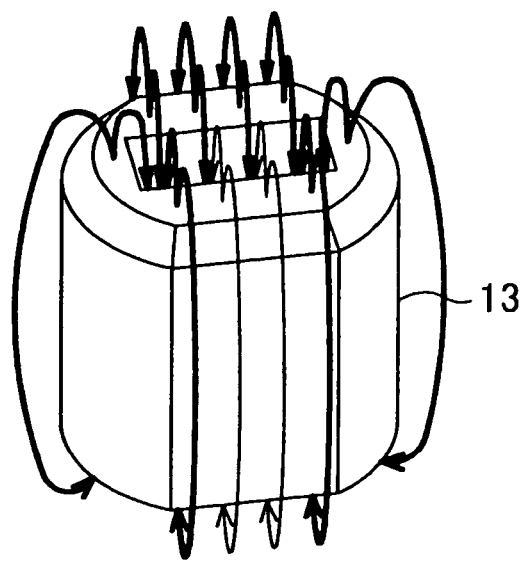
FIG. 32 is a perspective view showing magnetic flux of a bias magnet, according to a modification of the third embodiment.
Figure 33:
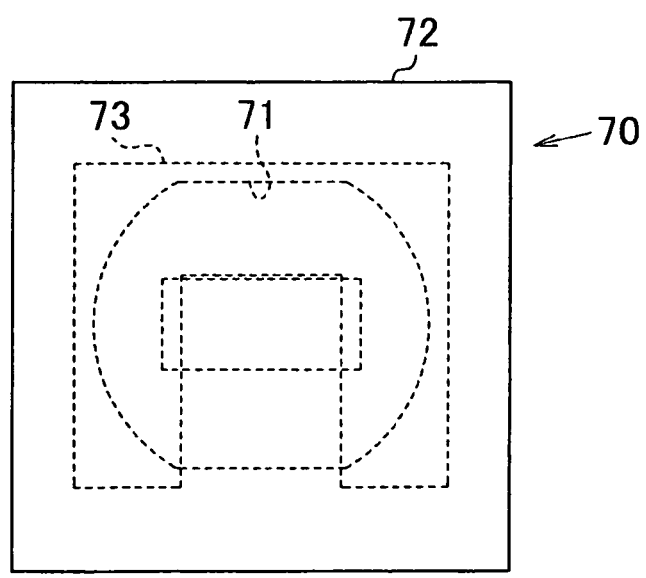
FIG. 33 is a plan view showing manufacturing equipment of the biasing magnet, according to the modification of the third embodiment.

That is, in the second embodiment mode, the biasing magnet has been formed in such a manner that the magnetic strengths of the biasing magnet portions which are located opposite to the front/rear arranging planes of the magnetic resistance elements MRE1 to MRE4 have been selectively set to the low magnetic field strengths. Alternatively, only such a magnetic field strength as to a portion which is located opposite to the arranging plane of the magnetic resistance elements MRE1 to MRE4 may be selectively set to a low magnetic field strength. As a result, as indicated in FIG. 32 corresponding to FIG. 20 such a biasing magnet 13 may be realized in which the magnetic field generated from the portion which is located opposite to the arranging plane of the magnetic resistance elements MRE1 to MRE4 is illustratively represented by a solid line whose width is made narrower than that of other portion. Then, magnetic vectors may be easily deflected, as compared with those generated from the previously explained biasing magnet 13 (see FIG. 21), while these magnetic vectors are produced from the magnetic field generated from the portion which is located opposite to the arranging plane of the magnetic resistance elements MRE1 to MRE4 of this biasing magnet 13 in conjunction with the rotations of the rotor. As a consequence, in such a case that only such a magnetic field strength as to the portion which is located opposite to the arranging plane of the magnetic resistance elements MRE1 to MRE4 is selectively set to the lower magnetic field strength, a similar effect to that of the first embodiment mode may also be achieved. It should be understood that when this biasing magnet 13 is manufactured, such a molding apparatus 70 as shown in FIG. 33 corresponding to FIG. 25 is employed. That is, this molding apparatus 70 has been arranged by employing a molding die 72 which has a cavity 71 corresponding to the shape of the biasing magnet 13. It should also be noted that this molding die 72 is manufactured by a non-magnetic material. Also, this molding apparatus 70 has been constituted by providing two sets of energizing coils 113 at upper and lower portions of the cavity 71. These two energizing coils 113 may cover the cavity 71 except for the portion which is located opposite to the arranging plane of the magnetic resistance elements MRE1 to MRE4. A method for manufacturing the biasing magnet 13 by using this molding apparatus 70 is carried out in the same manner to that of the first embodiment mode. Also, the above-explained biasing magnet in which only such a magnetic field strength as to the portion which is located opposite to the arranging plane of the magnetic resistance elements MRE1 to MRE4 is selectively set to the low magnetic field strength, may also be employed as a modification of the second embodiment mode.

In the above-explained second embodiment mode, the orientation of the magnetic powder contained in the molded body has been controlled by employing this energizing coils 73. Alternatively, a permanent magnet may be employed. In this alternative case, similar to the above-explained embodiment mode, the orientation of the magnetic powder may be alternatively controlled by using the magnetic fields generated from the permanent magnet. It should also be noted that such a permanent magnet may also be alternatively employed as a modification related to the second embodiment mode.

In each of the above-described embodiment modes, the magnetic field strengths as to the portions which are located opposite to the front/rear planes of the magnetic resistance elements MRE1 to MRE4 have been selectively set to the low magnetic field strengths. Alternatively, when such a magnetic field strength is set, for instance, these magnetic field setting operations may be carried out by utilizing demagnetization. In other words, such a biasing magnet whose magnetic field strengths have been substantially uniformly set may be molded by employing a molding apparatus similar to the conventional molding apparatus. Thereafter, magnetic field strengths as to the portions which are located opposite to the front/rear arranging planes of the magnetic resistance elements MRE1 to MRE4 may be selectively set to low magnetic field strengths by employing a demagnetizing device (not shown). Also, in this alternative case, such a biasing magnet which generates the magnetic fields as shown in FIG. 22 and FIG. 29 may be realized.

The above-described respective embodiment modes have described such a case of the biasing magnet 13 having the hollow portion 14, the sectional shape of which has been made in the rectangular shape. Alternatively, even when a biasing magnet having a hollow portion made in another shape is employed, this biasing magnet may be similarly covered by the inventive idea of the present invention. Also, as to the biasing magnet itself, not only such a biasing magnet formed in a hollow cylindrical shape may be employed, but also a biasing magnet formed in another different shape may be employed.

Such changes and modifications are to be understood as being within the scope of the present invention as defined by the appended claims.

What is claimed is:

1. Rotation detecting apparatus for detecting rotation of a magnetic rotor, the apparatus comprising:
    a sensor chip having a magnetoresistive device; and
    a bias magnet for applying bias magnetic field to the magnetoresistive device, wherein
    the bias magnet and the sensor chip are integrated,
    the magnetoresistive device is capable of detecting change of a magnetic vector near the sensor chip on the basis of resistance change of the magnetoresistive device so that the rotation detecting apparatus detects the rotation of the magnetic rotor,
    the change of the magnetic vector is generated by the bias magnetic field and the rotation of the magnetic rotor,
    the bias surrounds the sensor chip so that a deflection angle of the magnetic vector is controllable,
    the bias magnet includes a hollow portion having a groove,
    the groove has a predetermined shape for providing control of the deflection angle of the magnetic vector, the hollow portion of the bias magnet accommodates the sensor chip, and has a rectangular shape with a pair of wide sides, the wide sides of the hollow portion face the sensor chip, and are parallel to a surface of the sensor chip, the surface on which the magnetoresistive device is disposed, the groove of the hollow portion extends in a longitudinal direction of the bias magnet, and the groove is disposed on a center of the wide side of the hollow portion.

2. Rotation detecting apparatus for detecting rotation of a magnetic rotor, the apparatus comprising:

a sensor chip having a magnetoresistive device; and a bias magnet for applying bias magnetic field to the magnetoresistive device, wherein the bias maanet and the sensor chip are integrated, the magnetoresistive device is capable of detecting change of a magnetic vector near the sensor chip on the basis of resistance change of the magnetoresistive device so that the rotation detecting apparatus detects the rotation of the magnetic rotor, the change of the magnetic vector is generated by the bias magnetic field and the rotation of the magnetic rotor, the bias magnet surrounds the sensor chip so that a deflection angle of the magnetic vector is controllable, the bias magnet includes a hollow portion having a groove, the groove has a predetermined shape for providing control of the deflection angle of the magnetic vector, the hollow portion of the bias magnet accommodates the sensor chip, and has a rectangular shape with a pair of wide sides, the wide sides of the hollow portion face the sensor chip, and are parallel to a surface of the sensor chip, the surface on which the magnetoresistive device is disposed, the groove of the hollow portion extends in a longitudinal direction of the bias magnet, the groove has a triangular cross sectional shape with a vertex, and the vertex is disposed at a bottom of the groove.

3. Rotation detecting apparatus for detecting rotation of a magnetic rotor, the apparatus comprising:

a sensor chip having a magnetoresistive device; and a bias magnet for applying bias magnetic field to the magnetoresistive device, wherein the bias magnet and the sensor chip are integrated, the magnetoresistive device is capable of detecting change of a magnetic vector near the sensor chip on the basis of resistance change of the magnetoresistive device so that the rotation detecting apparatus detects the rotation of the magnetic rotor, the change of the magnetic vector is generated by the bias magnetic field and the rotation of the magnetic rotor, the bias magnet surrounds the sensor chip so that a deflection angle of the magnetic vector is controllable, the bias magnet includes a hollow portion having a groove, the groove has a predetermined shape for providing control of the deflection angle of the magnetic vector, the hollow portion of the bias magnet accommodates the sensor chip, and has a rectangular shape with a pair of wide sides, the wide sides of the hollow portion face the sensor chip, and are parallel to a surface of the sensor chip, the surface on which the magnetoresistive device is disposed, the groove of the hollow portion extends in a longitudinal direction of the bias magnet, the groove has a half circular cross sectional shape with a half circular arc, and the half circular arc is disposed on a bottom of the groove.

4. Rotation detecting apparatus for detecting rotation of a magnetic rotor, the apparatus comprising:

a sensor chip having a magnetoresistive device; and a bias magnet for applying bias magnetic field to the magnetoresistive device, wherein the bias magnet and the sensor chip are integrated in such a manner that the bias magnet surrounds the sensor chip, the magnetoresistive device is capable of detecting change of a magnetic vector near the sensor chip on the basis of resistance change of the magnetoresistive device so that the rotation detecting apparatus detects the rotation of the magnetic rotor, the change of the magnetic vector is generated by the bias magnetic field and the rotation of the magnetic rotor, the bias magnet includes a hollow portion having groove, the sensor chip is accommodated in the hollow portion of the bias magnet, the groove is disposed on an inner wall of the hollow portion, the hollow portion of the bias magnet has a rectangular shape with a pair of wide sides, the wide sides of the hollow portion face the sensor chip, and are parallel to a surface of the sensor chip, the surface on which the magnetoresistive device is disposed, the groove of the hollow portion extends in a longitudinal direction of the bias magnet, and the groove is disposed on a center of the wide side of the hollow portion.

5. Rotation detecting apparatus for detecting rotation of a magnetic rotor, the apparatus comprising:

a sensor chip having a magnetoresistive device; and a bias magnet for applying bias magnetic field to the magnetoresistive device, wherein the bias magnet and the sensor chip are integrated in such a manner that the bias magnet surrounds the sensor chip, the magnetoresistive device is capable of detecting change of a magnetic vector near the sensor chip on the basis of resistance change of the magnetoresistive device so that the rotation detecting apparatus detects the rotation of the magnetic rotor, the change of the magnetic vector is generated by the bias magnetic field and the rotation of the magnetic rotor, the bias magnet includes a hollow portion having a groove, the sensor chip is accommodated in the hollow portion of the bias magnet, the groove is disposed on an inner wall of the hollow portion, the hollow portion of the bias magnet has a rectangular shape with a pair of wide sides, the wide sides of the hollow portion face the sensor chip, and are parallel to a surface of the sensor chip, the surface on which the magnetoresistive device is disposed, the groove of the hollow portion extends in a longitudinal direction of the bias magnet, the groove has a triangular cross sectional shape with a vertex, and the vertex is disposed at a bottom of the groove.

6. Rotation detecting apparatus for detecting rotation of a magnetic rotor, the apparatus comprising:

a sensor chip having a magnetoresistive device; and a bias magnet for applying bias magnetic field to the magnetoresistive device, wherein the bias magnet and the sensor chip are integrated in such a manner that the bias magnet surrounds the sensor chip, the magnetoresistive device is capable of detecting change of a magnetic vector near the sensor chip on the basis of resistance change of the magnetoresistive device so that the rotation detecting apparatus detects the rotation of the magnetic rotor, the change of the magnetic vector is generated by the bias magnetic field and the rotation of the magnetic rotor, the bias magnet includes a hollow portion having a groove, the sensor chip is accommodated in the hollow portion of the bias magnet, the groove is disposed on an inner wall of the hollow portion, the hollow portion of the bias magnet has a rectangular shape with a pair of wide sides, the wide sides of the hollow portion face the sensor chip, and are parallel to a surface of the sensor chip, the surface on which the magnetoresistive device is disposed, the groove of the hollow portion extends in a longitudinal direction of the bias magnet, the groove has a half circular cross sectional shape with a half circular arc, and the half circular arc is disposed on a bottom of the groove.

7. Rotation detecting apparatus for detecting rotation of a magnetic rotor, the apparatus comprising:

a sensor chip having a magnetoresistive device; and a bias magnet for applying bias magnetic field to the magnetoresistive device, wherein the bias magnet and the sensor chip are integrated in such a manner that the bias magnet is disposed around the sensor chip, the magnetoresistive device is capable of detecting change of a magnetic vector near the sensor chip on the basis of resistance change of the magnetoresistive device so that the rotation detecting apparatus detects the rotation of the magnetic rotor, the change of the magnetic vector is generated by the bias magnetic field and the rotation of the magnetic rotor, the bias magnet includes a hollow portion, the sensor chip is accommodated in the hollow portion of the bias magnet, the hollow portion includes an inner wall, which faces the magnetoresistive device, and the bias magnet has a low magnetic strength portion near the inner wall facing the magnetoresistive device, the low magnetic strength portion having low magnetic strength lower than those of other positions of the bias magnet.

8. The apparatus according to claim 7, wherein the hollow portion includes another inner wall, which faces the magnetoresistive device, and the bias magnet has a low magnetic strength near the other inner wall facing the magnetoresistive device, the low magnetic strength being lower than those of other positions of the bias magnet except for the inner wall facing the magnetoresistive device.

9. The apparatus according to claim 7, wherein the bias magnet is made of resin material including a magnetic powder, the magnetic powder in the resin material has a predetermined magnetic orientation for controlling the magnetic strength of the bias magnet.

10. The apparatus according to claim 9, wherein the magnetic orientation of the magnetic powder near the inner wall facing the magnetoresistive device is weaker than those of other positions of the bias magnet so that the magnetic orientation provides the low magnetic strength near the inner wall facing the magnetoresistive device.

11. The apparatus according to claim 7, wherein the bias magnet has two ends, one of which faces the magnetic rotor, and the other one of which is opposite to the one end, the hollow portion penetrates from the one end to the other end, and the low magnetic strength of the bias magnet near the inner wall of the hollow portion facing the magnetoresistive device extends from the one end to the other end of the bias magnet.

12. The apparatus according to claim 7, wherein the bias magnet has an end facing the magnetic rotor, the low magnetic strength of the bias magnet near the inner wall of the hollow portion facing the magnetoresistive device extends from the one end of the bias magnet to a portion of the inner wall, the portion which faces the magnetoresistive device.

13. Rotation detecting apparatus for detecting rotation of a magnetic rotor, the apparatus comprising:

a sensor chip having a magnetoresistive device; and a bias magnet for applying bias magnetic field to the magnetoresistive device, wherein the bias magnet and the sensor chip are integrated in such a manner that the bias magnet is disposed around the sensor chip, the magnetoresistive device is capable of detecting change of a magnetic vector near the sensor chip on the basis of resistance change of the magnetoresistive device so that the rotation detecting apparatus detects the rotation of the magnetic rotor, the change of the magnetic vector is generated by the bias magnetic field and the rotation of the magnetic rotor, the bias magnet includes a hollow portion, the sensor chip is accommodated in the hollow portion of the bias magnet, the hollow portion includes an inner wall, which faces the magnetoresistive device, and the bias magnet has a high magnetic strength portion near the inner wall not facing the magnetoresistive device, the high magnetic strength portion having high magnetic strength higher than those of other positions of the bias magnet.

14. The apparatus according to claim 2, wherein the groove is disposed on a center of the wide side of the hollow portion.

15. The apparatus according to claim 3, wherein the groove is disposed on a center of the wide side of the hollow portion.

16. The apparatus according to claim 5, wherein the groove is disposed on a center of the wide side of the hollow portion.

17. The apparatus according to claim 6, wherein the groove is disposed on a center of the wide side of the hollow portion.

* * * * *